United States Patent
Papasakellariou

(10) Patent No.: US 10,986,648 B2
(45) Date of Patent: *Apr. 20, 2021

(54) COEXISTENCE OF DIFFERENT RADIO ACCESS TECHNOLOGIES OR SERVICES ON A SAME CARRIER

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/667,652

(22) Filed: Oct. 29, 2019

(65) Prior Publication Data

US 2020/0068592 A1   Feb. 27, 2020

Related U.S. Application Data

(63) Continuation of application No. 16/557,614, filed on Aug. 30, 2019, which is a continuation of application No. 15/685,796, filed on Aug. 24, 2017, now Pat. No. 10,405,332.

(60) Provisional application No. 62/413,147, filed on Oct. 26, 2016, provisional application No. 62/402,245, filed on Sep. 30, 2016, provisional application No.
(Continued)

(51) Int. Cl.
| | | |
|---|---|---|
| H04W 72/12 | (2009.01) | |
| H04L 5/00 | (2006.01) | |
| H04B 7/024 | (2017.01) | |
| H04W 16/14 | (2009.01) | |
| H04W 56/00 | (2009.01) | |
| H04W 72/04 | (2009.01) | |
| H04W 48/10 | (2009.01) | |
| H04B 7/06 | (2006.01) | |
| H04W 74/08 | (2009.01) | |

(52) U.S. Cl.
CPC ........ *H04W 72/1215* (2013.01); *H04B 7/024* (2013.01); *H04L 5/0053* (2013.01); *H04L 5/0094* (2013.01); *H04W 16/14* (2013.01); *H04W 56/00* (2013.01); *H04W 72/0406* (2013.01); *H04B 7/0626* (2013.01); *H04L 5/005* (2013.01); *H04W 48/10* (2013.01); *H04W 74/0891* (2013.01)

(58) Field of Classification Search
None
See application file for complete search history.

(56) References Cited

U.S. PATENT DOCUMENTS

| | | | |
|---|---|---|---|
| 8,942,176 B2 * | 1/2015 | Sumasu | H04L 12/18 370/328 |
| 2012/0083199 A1 * | 4/2012 | Redana | H04W 36/10 455/7 |

(Continued)

*Primary Examiner* — Otis L Thompson, Jr.

(57) ABSTRACT

A method of a user equipment (UE) operating with a new radio (NR) radio access technology (RAT). The method comprises receiving synchronization signals and a master information block (MIB) in a first bandwidth (BW) and receiving a physical downlink control channel (PDCCH) in a second BW, wherein the second BW is indicated by an offset in the MIB relative to the first BW and the PDCCH conveys a downlink control information (DCI) format that configures a reception of a first system information block (SIB).

20 Claims, 13 Drawing Sheets

Related U.S. Application Data

62/395,709, filed on Sep. 16, 2016, provisional application No. 62/383,649, filed on Sep. 6, 2016.

(56) References Cited

U.S. PATENT DOCUMENTS

| | | | |
|---|---|---|---|
| 2013/0064119 A1* | 3/2013 | Montojo | H04L 25/0224 370/252 |
| 2013/0142156 A1* | 6/2013 | Mazzarese | H04W 72/04 370/329 |
| 2013/0258935 A1* | 10/2013 | Zhang | H04L 12/189 370/312 |
| 2014/0177562 A1* | 6/2014 | Li | H04L 5/0064 370/329 |
| 2014/0204825 A1* | 7/2014 | Ekpenyong | H04L 5/001 370/312 |
| 2014/0233518 A1* | 8/2014 | Lee | H04W 72/082 370/329 |
| 2015/0009925 A1* | 1/2015 | Park | H04L 27/2602 370/329 |
| 2015/0126206 A1* | 5/2015 | Krishnamurthy | H04W 52/0206 455/452.1 |
| 2015/0207601 A1* | 7/2015 | Kim | H04L 5/005 370/329 |
| 2015/0305005 A1* | 10/2015 | Webb | H04L 5/0048 370/336 |
| 2015/0319701 A1* | 11/2015 | Ng | H04L 5/005 370/311 |
| 2015/0350992 A1* | 12/2015 | Han | H04B 7/0417 370/331 |
| 2016/0014778 A1* | 1/2016 | Zhou | H04L 5/0053 370/252 |
| 2016/0043849 A1* | 2/2016 | Lee | H04W 72/042 370/329 |
| 2016/0128006 A1* | 5/2016 | Ji | H04W 56/00 370/350 |
| 2016/0157235 A1* | 6/2016 | Xue | H04W 76/27 370/329 |
| 2016/0174251 A1* | 6/2016 | Zhang | H04W 52/0216 370/280 |
| 2016/0381561 A1* | 12/2016 | Yang | H04W 16/02 370/329 |
| 2017/0064658 A1* | 3/2017 | Yun | H04L 5/1438 |
| 2017/0064685 A1* | 3/2017 | Rico Alvarino | H04B 7/0456 |
| 2017/0086149 A1* | 3/2017 | Takeda | H04W 52/365 |
| 2017/0135029 A1* | 5/2017 | Chendamarai Kannan | H04W 72/04 |
| 2017/0257774 A1* | 9/2017 | Ghosh | H04L 5/0048 |
| 2017/0302355 A1* | 10/2017 | Islam | H04W 72/1284 |
| 2017/0310431 A1* | 10/2017 | Iyer | H04L 1/1816 |
| 2017/0347311 A1* | 11/2017 | Iyer | H04W 4/70 |
| 2017/0347341 A1* | 11/2017 | Zhang | H04W 41/0803 |
| 2017/0353865 A1* | 12/2017 | Li | H04W 16/14 |
| 2018/0007543 A1* | 1/2018 | Lee | H04L 5/0053 |
| 2018/0020462 A1* | 1/2018 | Xiong | H04L 1/1854 |
| 2018/0034599 A1* | 2/2018 | Zhou | H04L 5/0007 |
| 2018/0131430 A1* | 5/2018 | Gao | H04B 7/0626 |
| 2018/0145818 A1* | 5/2018 | Choi | H04L 5/0051 |
| 2018/0152924 A1* | 5/2018 | Ouchi | H04W 72/042 |
| 2018/0192383 A1* | 7/2018 | Nam | H04L 5/0044 |
| 2018/0248736 A1* | 8/2018 | Davydov | H04W 48/12 |
| 2018/0270819 A1* | 9/2018 | Yerramalli | H04L 5/0057 |
| 2018/0302843 A1* | 10/2018 | Frenger | H04W 48/10 |
| 2018/0332551 A1* | 11/2018 | Liu | H04W 56/0025 |
| 2020/0245305 A1* | 7/2020 | Bendlin | H04W 48/12 |

* cited by examiner

COEXISTENCE OF DIFFERENT RADIO ACCESS TECHNOLOGIES OR SERVICES ON A SAME CARRIER

CROSS-REFERENCE TO RELATED APPLICATIONS

This application is a continuation of U.S. patent application Ser. No. 16/557,614, filed Aug. 30, 2019, which is a continuation of U.S. patent application Ser. No. 15/685,796, filed Aug. 24, 2017, now U.S. Pat. No. 10,405,332, which claims priority to U.S. Provisional Patent Application No. 62/383,649, filed Sep. 6, 2016, U.S. Provisional Patent Application No. 62/395,709, filed Sep. 16, 2016, U.S. Provisional Patent Application No. 62/402,245, filed Sep. 30, 2016, and U.S. Provisional Patent Application No. 62/413,147, filed Oct. 26, 2016, the disclosures of which are herein incorporated by reference in their entirety.

TECHNICAL FIELD

The present application relates generally to a wireless communication system. More specifically, this disclosure relates to coexistence on a same carrier for user equipments (UEs).

BACKGROUND

A user equipment (UE) is commonly referred to as a terminal or a mobile station, can be fixed or mobile, and can be a cellular phone, a personal computer device, or an automated device. A gNB is generally a fixed station and can also be referred to as a base station, an access point, or other equivalent terminology. A communication system includes a downlink (DL) that refers to transmissions from a base station or one or more transmission points to UEs and an uplink (UL) that refers to transmissions from UEs to a base station or to one or more reception points.

SUMMARY

The present disclosure relates to a pre-$5^{th}$-generation (5G) or 5G communication system or new radio (NR) radio access technology (RAT) to be provided for supporting higher data rates beyond $4^{th}$-generation (4G) communication system such as long term evolution (LTE) RAT. The present disclosure relates to supporting LTE and NR coexistence when an LTE scheduler and an NR scheduler cannot support coordinated scheduling for UEs operating with an LTE RAT and for UEs operating with an NR RAT, respectively, to supporting LTE and NR coexistence when an LTE scheduler and an NR scheduler can support coordinated scheduling for UEs operating with an LTE RAT and for UEs operating with an NR RAT, respectively, and to optimizing support for LTE and NR coexistence when UEs capable of operating with an NR RAT are also capable for operating with an LTE RAT. The present disclosure also relates to supporting a transmission for a first service type during a first time slot without interfering with a transmission for a second service type during a second time slot that includes the first time slot, to supporting a transmission for a first service type during a first time slot without interfering with another transmission for the first service type during the first time slot, to a gNB reducing a probability of collision between a non-configured transmission and a configured transmission and to reduce a probability of collision between two non-configured transmissions, to a gNB multiplexing, over a common set of frequency resources and during a same time, control transmissions to UEs supporting a first service type using a first symbol duration for data transmission and to UEs supporting a second service using a second symbol duration for data transmissions, and to a UE to informing a gNB of a UE identity and of parameters for a transmission that is not configured by the gNB.

In one embodiment, a user equipment (UE) operating with a new radio (NR) radio access technology (RAT) is provided. The UE comprises a transceiver configured to receive synchronization signals and a master information block (MIB) in a first bandwidth (BW) and receive a physical downlink control channel (PDCCH) in a second BW wherein the second BW is indicated by an offset in the MIB relative to the first BW and the PDCCH conveys a downlink control information (DCI) format that configures a reception of a first system information block (SIB).

In another embodiment, a first base station operating with a new-radio (NR) radio access technology (RAT) is provided. The first base station comprises a transceiver configured to transmit, to a second base station that uses a long term evolution (LTE) RAT, a first signal over a first link, wherein the first signal indicates a bandwidth for transmission of synchronization signals and a first system information block according to the NR RAT.

In yet another embodiment, a method of a user equipment (UE) operating with a new radio (NR) radio access technology (RAT) is provided. The method comprises receiving synchronization signals and a master information block (MIB) in a first bandwidth (BW) and receiving a physical downlink control channel (PDCCH) in a second BW wherein the second BW is indicated by an offset in the MIB relative to the first BW and the PDCCH conveys a downlink control information (DCI) format that configures a reception of a first system information block (SIB).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, both frequency division duplexing (FDD) and time division duplexing (TDD) are considered as the duplex method for DL and UL signaling.

Although exemplary descriptions and embodiments to follow assume orthogonal frequency division multiplexing (OFDM) or orthogonal frequency division multiple access (OFDMA), this present disclosure can be extended to other OFDM-based transmission waveforms or multiple access schemes such as filtered OFDM (F-OFDM) or OFDM with zero cyclic prefix.

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation" (REF1); 3GPP TS 36.212 v13.2.0, "E-UTRA, Multiplexing and Channel coding" (REF2); 3GPP TS 36.213 v13.2.0, "E-UTRA, Physical Layer Procedures" (REF3); 3GPP TS 36.321 v13.2.0, "E-UTRA, Medium Access Control (MAC) protocol specification;" (REF4) and 3GPP TS 36.331 v13.2.0, "E-UTRA, Radio Resource Control (RRC) Protocol Specification" (REF5).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
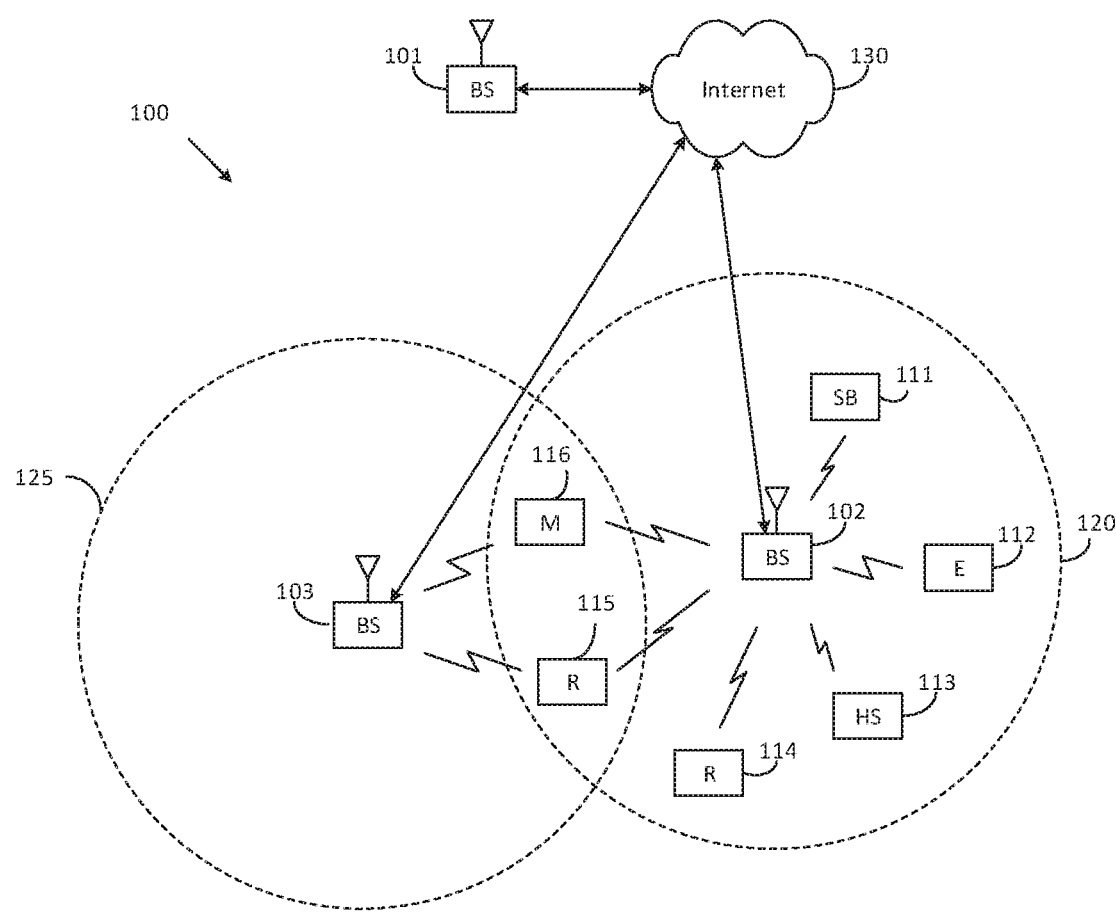
FIG. 1 illustrates an example wireless network according to embodiments of the present disclosure.
Figure 2:
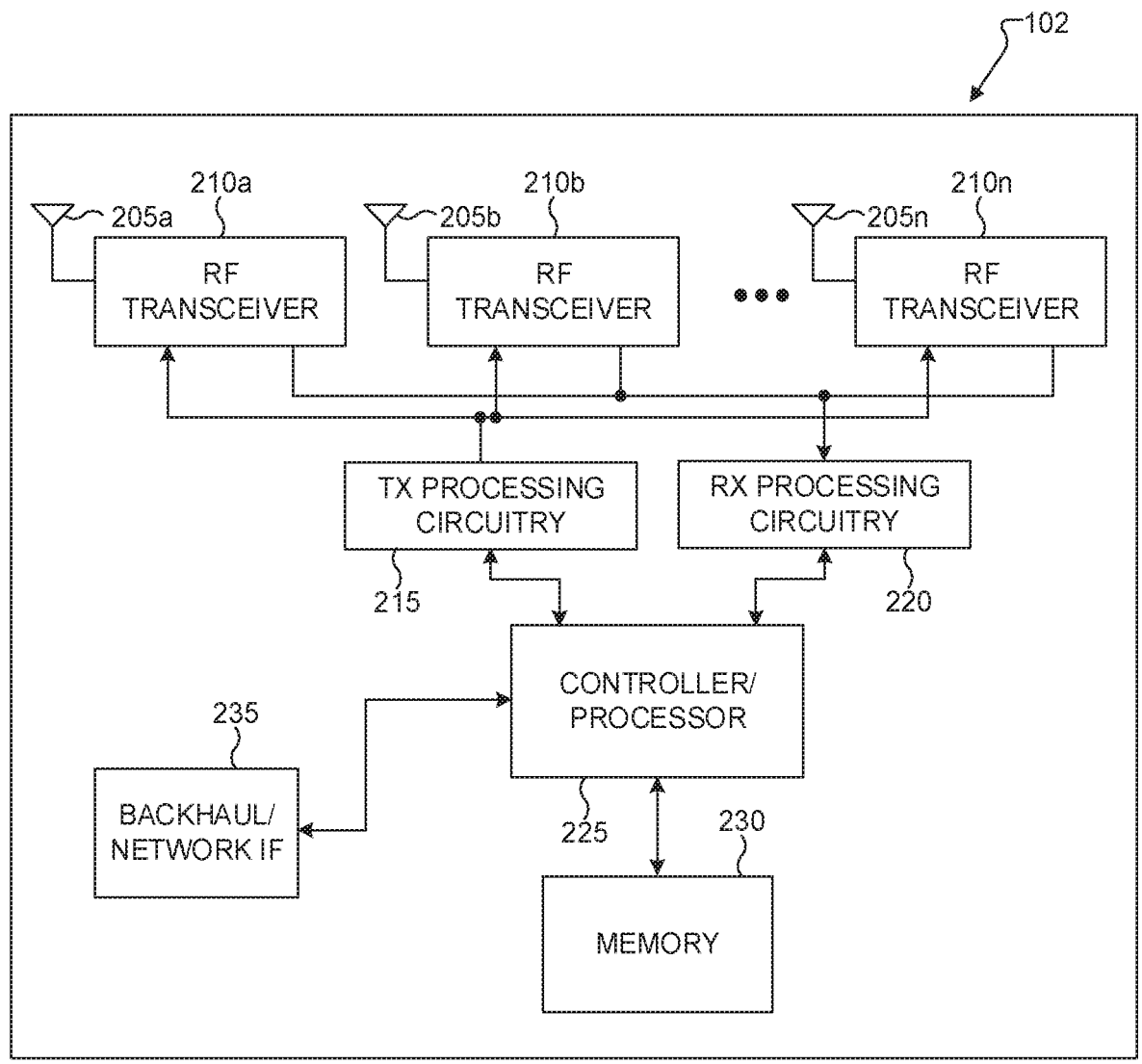
FIG. 2 illustrates an example gNB according to embodiments of the present disclosure.
Figure 3:
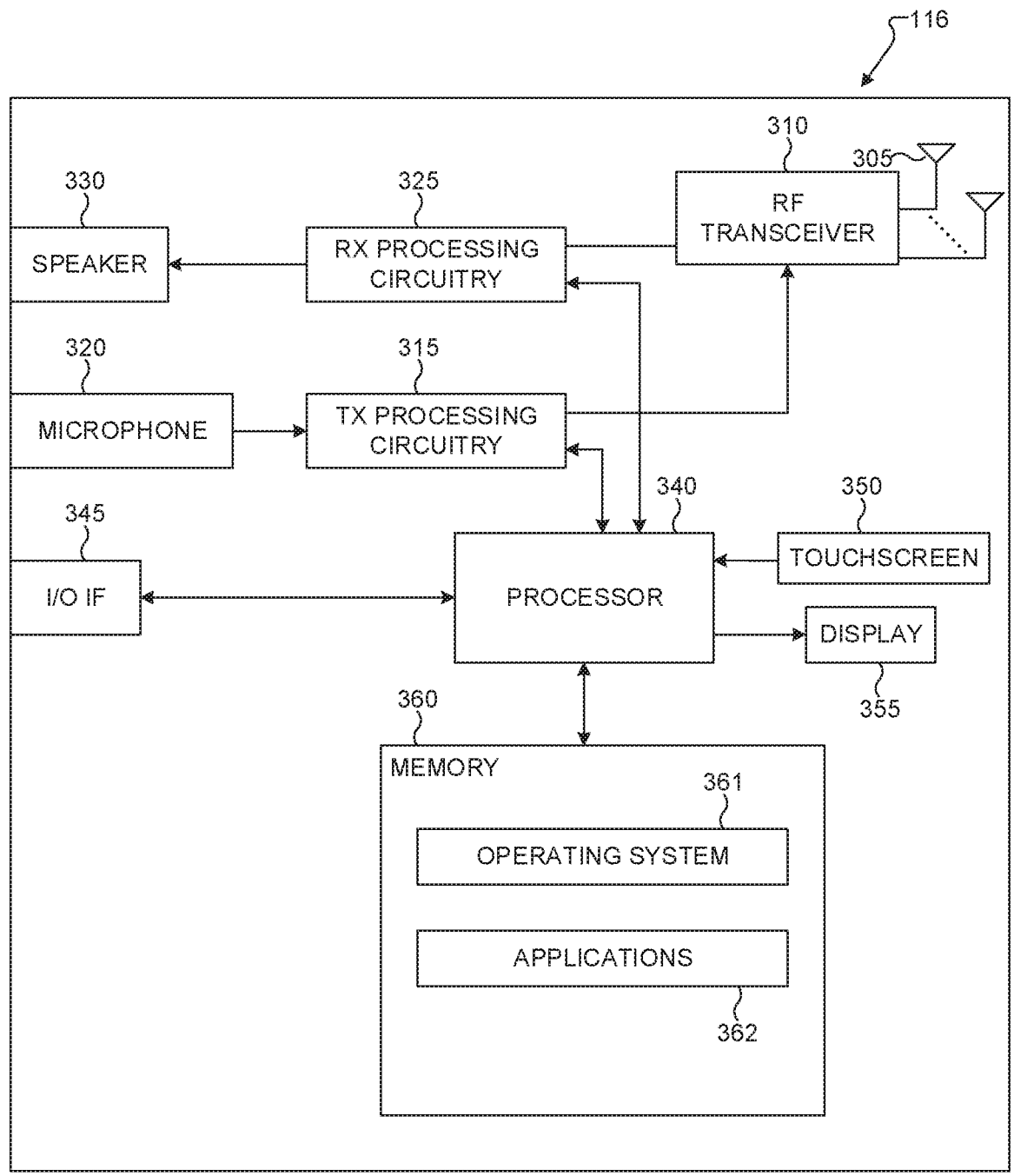
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary internet protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or gNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc.

For ease of reference, a base station providing service for a first RAT such as 5G/NR is referred to as gNB while a base station providing service for a second RAT such as LTE is referred to as eNB. It is possible that an eNB and a gNB correspond to a same base station. The terms "base station" and "TRP" can be used interchangeably in this disclosure to refer to network infrastructure components that provide wireless access to remote terminals. Also, depending on the network type, the term UE can refer to any component such as a mobile station, a subscriber station, a remote terminal, a wireless terminal, a receive point, or a user device. A UE can be a mobile device or a stationary device.

For the sake of convenience, the terms "eNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient channel state information (CSI) reporting on an uplink channel in an advanced wireless communication system. In certain embodiments, and one or more of the gNB s 101-103 includes circuitry, programming, or a combination thereof.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate intermediate frequency (IF) or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceivers 210a-210n are capable of transmitting, to another eNB (e.g., base station) a signal indicating bandwidth information for synchronization signal and system information block, and receiving, from the other eNB, a signal indicating a number of decoding operation for PDCCH to configure a UE. In some embodiments, the RF transceivers 210a-210n are capable of receiving, from another base station, a signal including configuration information for a predetermined number of subframes in normal and MBSFN subframes based on LTE RAT, and information for a number of subframe symbols in normal and MBSFN subframes. In some embodiments, the RF transceivers 210a-210n are capable of receiving a signal indicating a cell identity and a number of antenna ports for CRS, and receiving a signal comprising configuration information for SRS, downlink, uplink, and special subframes according to the LTE RAT.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

In some embodiments, the controller/processor 225 includes at least one microprocessor or microcontroller. As described in more detail below, the gNB 102 may include circuitry, programming, or a combination thereof for processing of an uplink channel and/or a downlink channel. For example, controller/processor 225 can be configured to execute one or more instructions, stored in memory 230, that are configured to cause the controller/processor to process the signal.

The controller/processor 225 is also capable of executing programs and other processes resident in the memory 230, such as an operating system (OS). The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, an RF transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an OS 361 and one or more applications 362.

The RF transceiver 310 receives, from the antenna 305, an incoming RF signal transmitted by a gNB of the network 100. The RF transceiver 310 down-converts the incoming RF signal to generate an IF or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving synchronization signals, an MIB, and PDCCH. In such embodiments, SIB indicates a number of antenna ports used for CRS according to an LTE RAT. In some embodiments, the RF transceiver 310 is capable of transmitting a signal according to the NR RAT with a power determined according to a path-loss measured from the CRS and receiving an indication to perform decoding operations for PDCCH. In some embodiments, the RF transceiver 310 is capable of receiving synchronization signals according to an LTE RAT, a subframe number, and a downlink BW for an LTE RAT. In some embodiments, the RF transceiver 310 is capable of excluding from NR RAT receptions symbols, subcarriers of the CSI-RS, and a number of subframe symbols.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for reference signal on a downlink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining symbols and subcarriers for synchronization signals and of an MIB according to the LTE RAT and performing a rate matching operation for NR RAT receptions around the symbols and subcarriers. In such embodiments, an SIB indicates configuration information for CSI-RS, a partitioning of a predetermined number of subframes in a normal and MBSFN subframes according to the LTE, and a number of subframe symbols in normal and MBSFN subframe.

The memory 360 is coupled to the processor 340. Part of the memory 360 could include an RAM, and another part of the memory 360 could include a Flash memory or other ROM.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
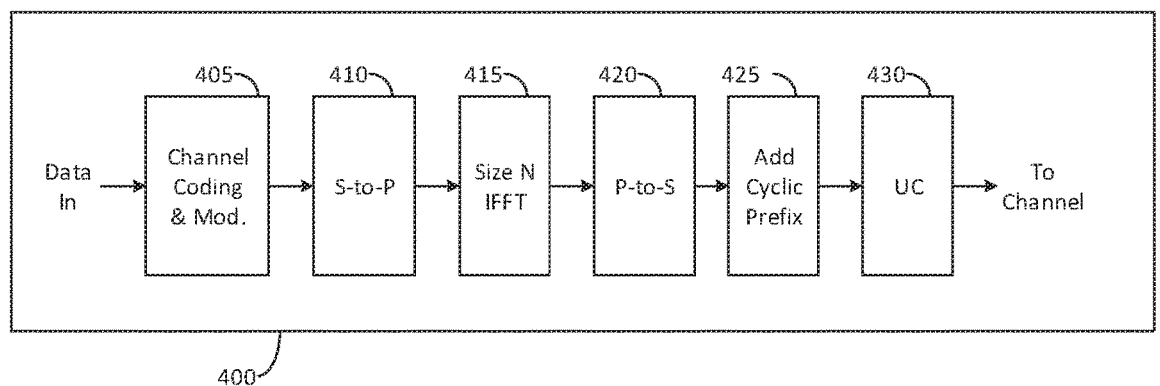
FIG. 4A illustrates a high-level diagram of an orthogonal frequency division multiple access transmit path according to embodiments of the present disclosure.
Figure 4B:
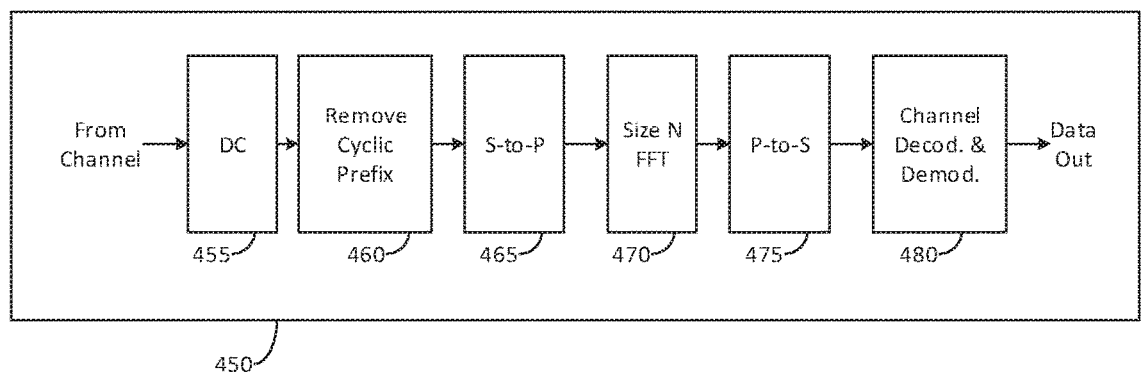
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an OFDMA communication. FIG. 4B is a high-level diagram of receive path circuitry 450. For example, the receive path circuitry 450 may be used for an OFDMA communication. In FIGS. 4A and 4B, for downlink communication, the transmit path circuitry 400 may be implemented in a base station (e.g., gNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, size N inverse fast Fourier transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size n FFT block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of size N may be modified according to the implementation.

Furthermore, although this disclosure is directed to an embodiment that implements the fast Fourier transform and the inverse fast Fourier transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

DL transmissions or UL transmissions can be based on an OFDM waveform including a variant using DFT preceding that is known as DFT-spread-OFDM that is typically applicable to UL transmissions.

In the following, subframe (SF) refers to a transmission time unit for the LTE RAT and slot refers to a transmission time unit for an NR RAT. For example, the slot duration can be a sub-multiple of the SF duration. NR can use a different DL or UL slot structure than an LTE SF structure. Differences can include a structure for transmitting PDCCH, locations and structure of DMRS, transmission duration, and so on. Further, eNB refers to a base station serving UEs operating with LTE RAT and gNB refers to a base station serving UEs operating with NR RAT. For brevity, the term slot is subsequently used but corresponding descriptions for the DL or UL transmission and reception structures are also applicable for a SF.

An SF (or a slot) is part of frame that includes ten SFs (or slots). A frame can be identified by a system frame number (SFN) ranging from 0 to 1023 (and can be represented by 10 binary elements). For brevity, remaining descriptions assume that an OFDM symbol has a normal cyclic prefix (CP) but the embodiments are also directly applicable to the case that an OFDM symbol has an extended CP. Some SFs (or slots) in a frame can be configured as multicast-broadcast SFN (MBSFN) SFs (or slots) or as almost-blank (ABS) SFs (or slots).

A slot includes one or more slot symbols. A BW unit is referred to as a resource block (RB). One RB includes a number of sub-carriers (SCs). For example, a slot can have duration of half millisecond or of one millisecond, include 7 symbols or 14 symbols, respectively, and a RB can have a BW of 180 KHz and include 12 SCs with inter-SC spacing of 15 KHz or 60 KHz. A BW reception capability or a BW transmission for a UE can be smaller than a DL system BW or an UL system BW, respectively, and different UEs can be configured DL receptions or UL transmissions in different parts of a DL system BW or of an UL system BW, respectively, per slot.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A gNB transmits one or more of multiple types of RS including common RS (CRS), channel state information RS (CSI-RS) and demodulation RS (DMRS). A CRS can be transmitted over an entire DL cell BW in subcarriers determined by a physical cell identity and can be used by UEs to demodulate data or control signals, for time tracking or frequency tracking, or to perform measurements such as a RS received power (RSRP) measurement to determine a path-loss (PL). To reduce CRS overhead, an eNB can transmit a CSI-RS with a smaller density in the time or frequency domain than a CRS. A CSI-RS is intended for UEs to measure CSI or perform PL measurements. A DMRS is typically transmitted only in the BW of a respective PDCCH or PDSCH and a UE can use the DMRS to demodulate DCI or data information. A DL DMRS or CSI-RS can be constructed by a Constant amplitude zero autocorrelation (CAZAC) sequence or a pseudo-noise (PN) sequence.

For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources. A UE can determine CSI-RS transmission parameters through higher layer signaling, such as RRC signaling from a gNB. Transmission instances and resources of a CSI-RS can be indicated by DL control signaling or configured by higher layer signaling. A DMRS is transmitted only in the BW of a respective PDCCH or PDSCH and a UE can use the DMRS to demodulate data or control information.

DCI can serve several purposes. A DCI format includes information elements (IEs) and is typically used for scheduling a PDSCH (DL DCI format) or a PUSCH (UL DCI format) transmission. A DCI format includes cyclic redundancy check (CRC) bits in order for a UE to confirm a correct detection. A DCI format type is identified by a radio network temporary identifier (RNTI) that scrambles the CRC bits. For a DCI format scheduling a PDSCH or a PUSCH for a single UE with RRC connection to an eNB, the RNTI is a cell RNTI (C-RNTI). Different DCI formats may be associated with different PDSCH or PUSCH Transmission Modes (TMs) configured to a UE. For a DCI format scheduling a PDSCH conveying system information (SI) to a group of UEs, the RNTI is a SI-RNTI.

For a DCI format scheduling a PDSCH providing a response to a random access (RA) from a group of UEs, the RNTI is a RA-RNTI. For a DCI format scheduling a PDSCH providing contention resolution in Msg4 of a RA process, the RNTI is a temporary C-RNTI (TC-RNTI). For a DCI format scheduling a PDSCH paging a group of UEs, the RNTI is a P-RNTI. For a DCI format providing transmission power control (TPC) commands to a group of UEs, the RNTI is a TPC-RNTI. Each RNTI type is configured to a UE through higher layer signaling (and the C-RNTI is unique for each UE). A UE typically decodes at multiple candidate locations for potential PDCCH transmissions. Additionally, semi-persistent scheduling (SPS) can be used to schedule PDSCH transmissions to or PUSCH transmissions from a UE without an eNB having to transmit a DCI format to schedule each such transmission. With SPS, a UE is configured by an eNB through higher layer signaling frequency resources and a periodically to receive a PDSCH or transmit a PUSCH.

DL signaling also includes transmission of a logical channel that carries system control information is referred to as broadcast control channel (BCCH). A BCCH is mapped to either a transport channel referred to as a broadcast channel (BCH) or to a DL shared channel (DL-SCH). A BCH is mapped to a physical channel referred to as Physical BCH (PBCH). A DL-SCH is mapped to PDSCH. A master information block (MIB) is transmitted using BCH, while other SI is provided by system information blocks (SIBs) using DL-SCH (MIB and SIBs constitute the SI). After a UE acquires a physical cell identity (PCID) for a cell, the UE can perform DL channel measurement using a CRS to decode PBCH and PDSCH. A MIB includes a minimal amount of system information that is needed for a UE to be able to receive remaining system information provided by DL-SCH.

A MIB has predefined format and includes information of DL BW, PHICH related information, SFN, and spare bits. A UE needs to know a PHICH configuration to be able to receive PDCCH which, in turn, is needed to receive DL-SCH. A PBCH is transmitted using a minimum BW of 6 RBs in the central part of a DL cell BW and in SF #0 of four successive frames. Most SI is included in several SIBs. SIB 1 mainly includes information related to whether a UE is allowed to camp on a respective cell. In case of TDD, SIB 1 also includes information about an allocation of UL/DL SFs (UL/DL configuration) and configuration of a special SF. SIB 1 also includes information about a time-domain scheduling of remaining SIBs (SIB 2 and beyond). SIB2 includes information that UEs need in order to be able to access a cell. This includes information about an UL cell BW, random-access parameters, and parameters related to UL power control. SIB3-SIB 13 mainly includes information related to cell reselection, neighboring-cell-related information, public warning messages, and so on.

Figure 5:
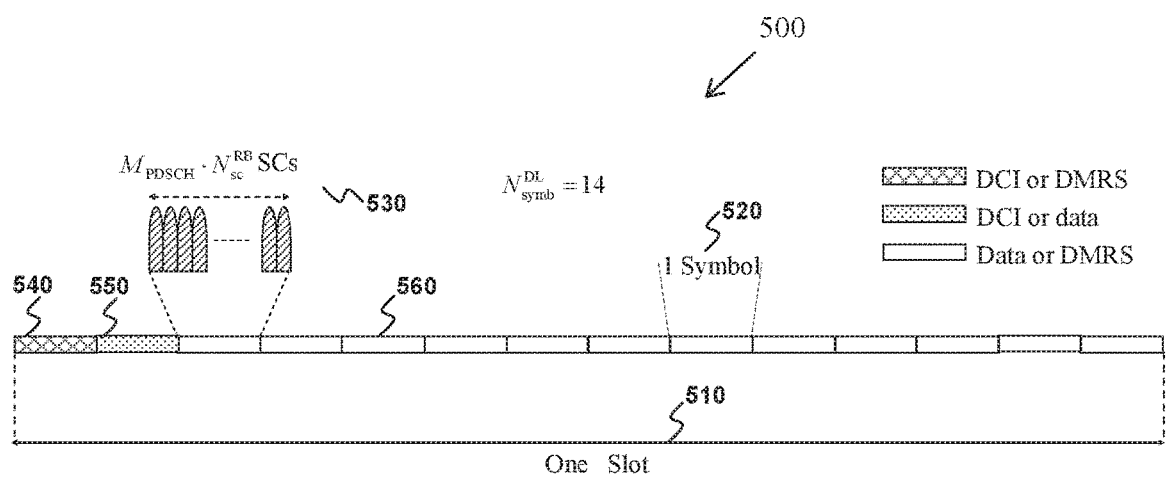
FIG. 5 illustrates an example slot structure for DL transmissions according to embodiments of the present disclosure.

FIG. 5 illustrates an example slot or SF structure 500 for DL transmissions according to embodiments of the present disclosure. An embodiment of the slot structure 500 shown in FIG. 5 is for illustration only. Other embodiments may be used without departing from the scope of the present disclosure.

A slot 510 includes $N_{symb}^{DL}$ symbols 520 where a gNB can transmit data information, DCI, or DMRS. A DL system BW includes $N_{RB}^{DL}$ RBs. Each RB includes $N_{sc}^{RB}$ SCs. A UE is assigned $M_{PDSCH}$ RBs for a total of $M_{sc}^{PDSCH} = M_{PDSCH} \cdot N_{sc}^{RB}$ SCs 530 for a PDSCH transmission BW. A PDCCH conveying DCI is transmitted over control channel elements (CCEs) that are substantially spread across a part or all of the DL system BW. A first symbol 540 can be used by the gNB to transmit PDCCH and DMRS associated with PDCCH demodulation. A second symbol 550 can be used by the gNB to transmit PDCCH or PDSCH. Remaining symbols 560 can be used by the gNB to transmit PDSCH, DMRS associated with each PDSCH, and CSI-RS. In some slots, the gNB can also transmit synchronization signals and system information.

In some wireless networks, UL signals include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or the UE can transmit data and some UCI in a PUSCH and transmit remaining UCI in a PUCCH when an eNB configures the UE for simultaneous PUSCH and PUCCH transmission. UCI includes HARQ-ACK information, indicating correct or incorrect detection of data transport blocks (TBs) in a PDSCH, scheduling request (SR) indicating whether a UE has data in the UE's buffer, and CSI enabling an eNB to select appropriate parameters for link adaptation of PDSCH or PDCCH transmissions to a UE. CSI includes a channel quality indicator, a precoding matrix indicator, and a rank indicator. UL RS includes DMRS and sounding RS (SRS) and can use sequences, such as CAZAC sequences, for the UL RS's transmission.

A UE transmits DMRS only in a BW of a respective PUSCH or PUCCH and an eNB can use a DMRS to demodulate information in a PUSCH or PUCCH. A UE transmits SRS to provide an eNB with an UL CSI. A SRS transmission from a UE can be periodic (P-SRS, or trigger type 0 SRS) or aperiodic (A-SRS, or trigger type 1 SRS) as triggered by a SRS request field included in a DCI format conveyed by a PDCCH scheduling PUSCH or PDSCH.

One of the fundamental requirements in an operation of a communication system is a capability for a UE to request a connection setup; such request is commonly referred to as random access. Random access is used for several purposes, including: initial access when establishing a radio link; re-establishing a radio link after radio-link failure, handover when uplink synchronization needs to be established to a new cell, UL synchronization, UE positioning based on UL measurements, and as an SR if no dedicated SR resources have been configured on a PUCCH. Acquisition of UL timing at a serving eNB is one of the main objectives of random access; when establishing an initial radio link, a random-access process also serves for assigning a unique identity through a C-RNTI to a UE.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, a SRS transmission can also provide a PMI for DL transmission. Additionally, in order to establish synchronization or an initial RRC connection with a gNB, a UE can transmit a physical random access channel.

A PUSCH transmission power from a UE is set with an objective to achieve a reliability target for associated data by achieving a respective target received SINR at a serving cell of a gNB while controlling interference to neighboring cells. UL power control (PC) includes open-loop PC (OLPC) with cell-specific and UE-specific parameters and closed-loop PC (CLPC) corrections provided to a UE by a gNB through TPC commands. When a PUSCH transmission is scheduled by a PDCCH, a TPC command is included in a respective DCI format.

A UE can derive a PUSCH transmission power $P_{PUSCH,c}(i)$, in decibels per milliwatt (dBm), in cell c and slot i as in Equation 1 given by:

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{Bmatrix} [dBm] \quad \text{Equation (1)}$$

where, $P_{CMAX,c}(i)$ is a maximum UE transmission power in cell c and slot i, $M_{PUSCH,c}(i)$ is a PUSCH transmission BW in RBs in cell c and slot i, $P_{O\_PUSCH,c}(j)$ controls a mean received SINR at the gNB in cell c, $PL_c$ is a PL estimate computed by the UE for cell c, for j=0 or j=1, $\alpha_c(j) \in \{0, 0.4, 0.5, 0.6, 0.7, 0.8, 0.9, 1\}$ is configured to the UE by the gNB through higher layer signaling and fractional UL PC is obtained for $\alpha_c(j)<1$ as a PL is not fully compensated, $\Delta_{TF,c}(i)$ is either equal to 0 or is determined by a spectral efficiency of a PUSCH transmission as $\Delta_{TF,c}(i)=10 \log_{10}((2^{BBPRE \cdot K_s}-1) \cdot \beta_{offset}^{PUSCH})$ where, $K_S$ is configured to a UE by higher layer signaling, BPRE=$Q_{CQI}/N_{RE}$ for A-CSI sent via PUSCH without UL-SCH data and $$\sum_{r=0}^{C-1} K_r/N_{RE}$$

for other cases, where c is a number of code blocks, $K_r$ is a size for code block r, $O_{CQI}$ is a number of CQI/PMI bits including CRC bits and $N_{RE}$ is a number of REs determined as $N_{RE}=M_{sc}^{PUSCH-initial} \cdot N_{symb}^{PUSCH-initial}$, where c, $K_r$, $M_{sc}^{PUSCH-initial}$ and $N_{symb}^{PUSCH-initial}$, $\beta_{offset}^{PUSCH}=\beta_{offset}^{CQI}$ for A-CSI sent via PUSCH without UL-SCH data and 1 for other cases, and $f_c(i)=f_c(i-1)+\delta_{PUSCH,c}(i-K_{PUSCH})$ if accumulative CLPC is used, and $f_c(i)=\delta_{PUSCH,c}(i-K_{PUSCH})$ if absolute CLPC is used where $\delta_{PUSCH,c}(i-K_{PUSCH})$ is a TPC command included in a DCI format scheduling a PUSCH or included in a DCI format 3/3A. $K_{PUSCH}$ is derived from a timeline between a slot of a PDCCH transmission scheduling a PUSCH and a slot of a respective PUSCH transmission.

Figure 6:
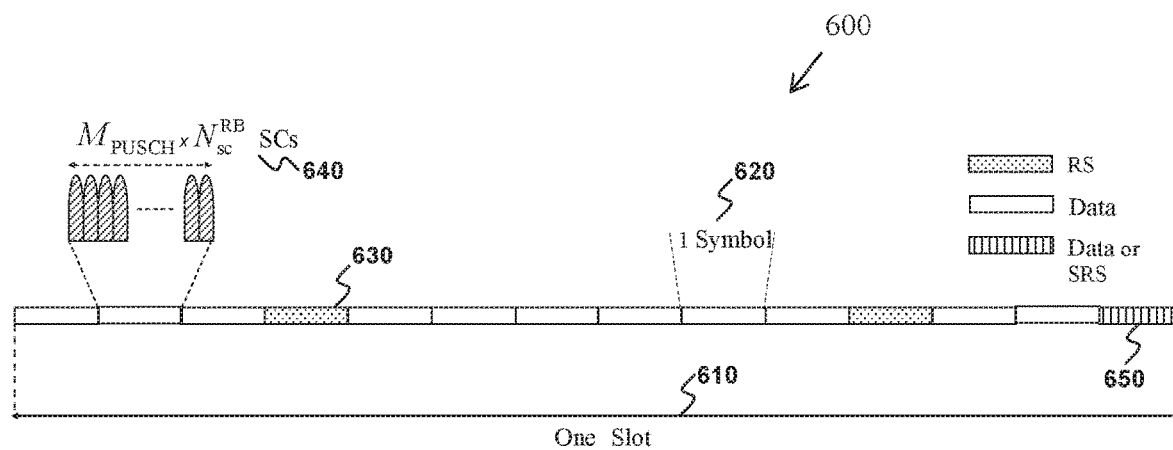
FIG. 6 illustrates an example slot structure for PUSCH transmission according to embodiments of the present disclosure.

FIG. 6 illustrates an example slot structure 600 for PUSCH transmission according to embodiments of the present disclosure. An embodiment of the slot structure 600 shown in FIG. 6 is for illustration only. Other embodiments may be used without departing from the scope of the present disclosure.

A slot 610 which includes a total of $N_{symb}^{UL}$ symbols 620 for transmitting data information, UCI, or RS. Some slot symbols are used for transmitting DMRS 630. Each RB includes $N_{sc}^{RB}$ SCs and a UE is allocated $M_{PUSCH}$ RBs 640 for a total of $M_{sc}^{PUSCH}=M_{PUSCH} \cdot N_{sc}^{RB}$ SCs for a transmission BW. A last slot symbol can be used to multiplex SRS transmissions 650 from one or more UEs. For 2 slot symbols used for DMRS transmission, a number of slot symbols available for data/UCI/DMRS transmission is $N_{symb}^{PUSCH}=N_{symb}^{UL}-2-N_{SRS}$, where $N_{SRS}=1$ when the last slot symbol is used to transmit SRS and $N_{SRS}=0$ otherwise.

A hybrid slot includes a DL transmission region, a guard period region, and an UL transmission region, similar to a special SF. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

Figure 7:
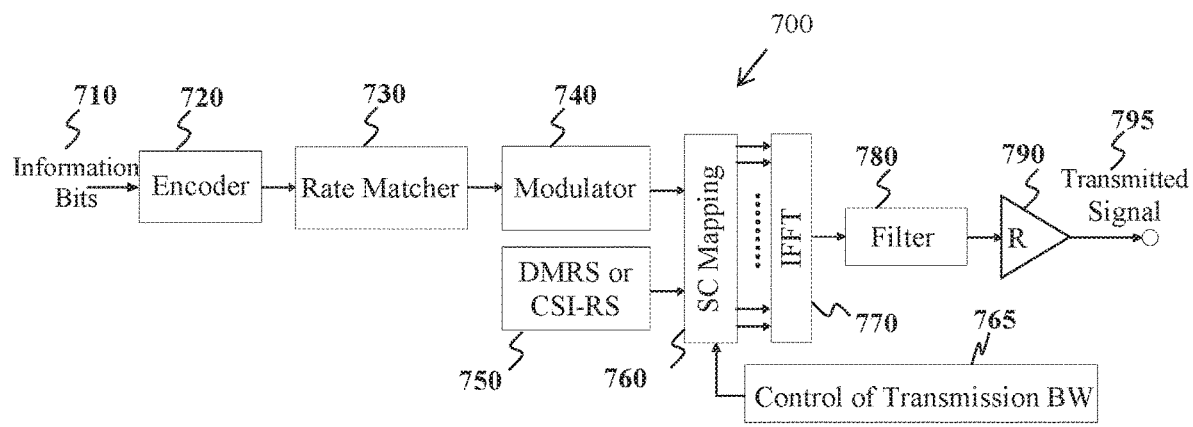
FIG. 7 illustrates an example transmitter structure using OFDM according to embodiments of the present disclosure.

FIG. 7 illustrates an example transmitter structure 700 using OFDM according to embodiments of the present disclosure. An embodiment of the transmitter structure 700 shown in FIG. 7 is for illustration only. Other embodiments may be used without departing from the scope of the present disclosure.

Information bits, such as DCI bits or data bits 710, are encoded by encoder 720, rate matched to assigned time/frequency resources by rate matcher 730, and modulated by modulator 740. Modulated encoded symbols and DMRS or CSI-RS 750 are mapped to SCs 760 by SC mapping unit 765, an IFFT is performed by filter 770, a CP is added by CP insertion unit 780, and a resulting signal is filtered by filter 790 and transmitted by an radio frequency (RF) unit 795.

Figure 8:
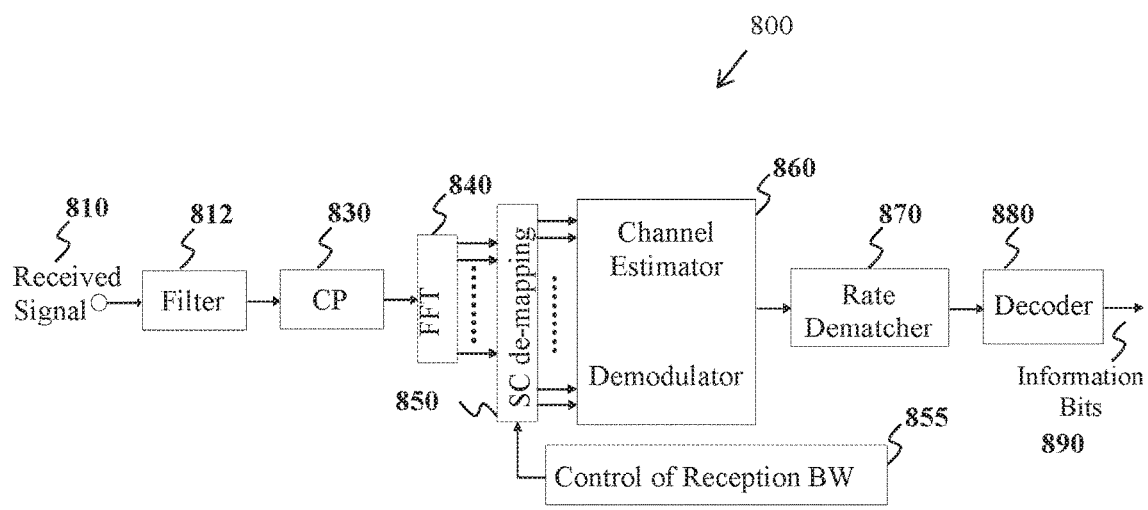
FIG. 8 illustrates an example receiver structure using OFDM according to embodiments of the present disclosure.

FIG. 8 illustrates an example receiver structure 800 using OFDM according to embodiments of the present disclosure. An embodiment of the receiver structure 800 shown in FIG. 8 is for illustration only. Other embodiments may be used without departing from the scope of the present disclosure A received signal 810 is filtered by filter 820, a CP removal unit removes a CP 830, a filter 840 applies an FFT, SCs de-mapping unit 850 de-maps SCs selected by BW selector unit 855, received symbols are demodulated by a channel estimator and a demodulator unit 860, a rate dematcher 870 restores a rate matching, and a decoder 1180 decodes the resulting bits to provide information bits 890.

One characteristic of so-called 5G systems is that slot duration can depend on a service type. Additionally symbol duration or, equivalently, a sub-carrier spacing can depend on the service type. For example, for services that can benefit from low latency the slot duration can be 0.1 msec while for latency-tolerant services an overhead associated with packet headers can be minimized by transmitting larger data TBs over a longer slot and a slot duration can be 0.5 msec or longer. Different services can also require different reliability requirements; for example, ultra-reliable services can require a BLER of 0.1% or smaller while typical mobile broadband services can require a BLER of 1% or larger.

As an NR RAT is introduced in an existing LTE network, it is highly likely that at least for early deployments, both LTE and NR may need to co-exist in a same or in an overlapping spectrum. Spectrum sharing is then required to support LTE and NR coexistence. Spectrum sharing mechanisms can depend on several factors including whether or not an LTE scheduler and an NR scheduler can perform coordinated scheduling and whether or not a UE capable for operating with an NR RAT can also operate with an LTE RAT. Coordinated scheduling is typically possible when an eNB scheduler for LTE and a gNB scheduler for NR are collocated, in such case even a same scheduler for LTE and NR can be possible, or connected via a backhaul with materially negligible latency in order to exchange dynamic configurations over respective interfaces. Non-coordinated scheduling is typically required when conditions for coordinated scheduling cannot be fulfilled. Also, LTE and NR coexistence can depend on whether or not NR capable UEs are also LTE capable as, when this holds, NR capable UEs can perform initial access to a network as LTE UEs.

Ultra reliable low latency communication (URLLC) poses significant challenges in a network operation as corresponding data or control information needs to be transmitted almost immediately and reliably regardless of the existence of other ongoing transmissions over an associated BW. The challenges are also different between DL transmissions and UL transmission for URLLC. In the DL, a gNB can transit URLLC service but puncturing, when necessary, other ongoing service such as enhanced mobile broadband (eMBB) service. Even though there is performance degradation in the reception reliability of eMBB data TBs, including potentially a complete loss of one or more data code blocks (CBs) of a data TB, a degradation in the reception reliability of URLLC data TBs can be avoided as the gNB can avoid interference on URLLC transmissions from other transmissions on the same carrier. Moreover, the gNB can mitigate the puncturing impact on eMBB data TBs by retransmitting punctured data CBs or by retransmitting the entire data TB or by other means such as using an outer block code.

For UL URLLC transmissions initiated by respective UEs, it is more challenging to ensure a desired reception reliability as such transmissions are decentralized and a serving gNB cannot generally ensure that a URLLC transmission from a UE may not be interfered from one or more eMBB transmissions from first other UEs or from one or more URLLC transmissions from second other UEs. For example, when a UE transmits URLLC data over a BW, there can be one or more ongoing eMBB transmissions over the BW or there can be one or more other URLLC transmissions over the BW. Moreover, a URLLC transmission from a UE can occur autonomously without a serving gNB knowing in advance of the URLLC transmission. Consequently, means need to be provided for the gNB to detect the URLLC transmission and identify the associated UE.

Figure 9:
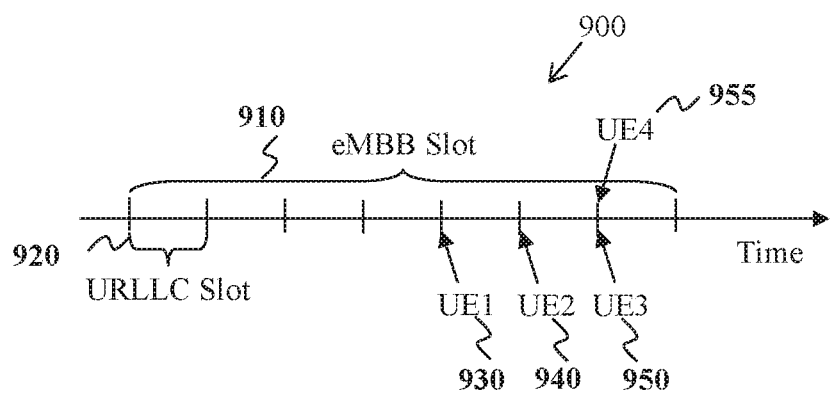
FIG. 9 illustrates an example URLLC transmission from a UE to a gNB according to embodiments of the present disclosure.

FIG. 9 illustrates an example URLLC transmission 900 from a UE to a gNB according to embodiments of the present disclosure. An embodiment of the URLLC transmission 900 shown in FIG. 9 is for illustration only. Other embodiments may be used without departing from the scope of the present disclosure.

An eMBB slot 910 includes seven eMBB symbols. A URLLC slot includes a number of URLLC symbols with total duration equal to the duration of one eMBB symbol 920. A first UE, UE1 930, and a second UE, UE2 940, transmit URLLC service in respective URLLC slots without interference from other URLLC service in a corresponding transmission BW. A third UE, UE3 950, and a fourth UE, UE4 955, transmit URLLC service in a same URLLC slot and in respective BWs that at least partially overlap and therefore URLLC transmissions from UE3 and URLLC transmissions from UE4 experience mutual interference that degrades respective reception reliabilities. Also, when eMBB UEs transmit in the eMBB slot 910 over a BW that at least partially overlap with a BW of URLLC transmissions during the eMBB slot, the transmission from a eMBB UE experiences mutual interference with transmissions from one or more URLLC UEs and all respective reception reliabilities are degraded.

When a UE transmits to a serving gNB without the serving gNB having configured the transmission from the UE, it can be challenging for the serving gNB to detect the transmission from the UE. The gNB needs to attempt to detect non-configured transmissions at applicable frequency resources at each possible time slot and this can result to missed detections and either require large operational complexity when variable MCS or RB allocation can apply for each transmission or penalize spectral efficiency when a fixed MCS or a fixed RB allocation apply for each transmission. Therefore, there is a need to support LTE and NR coexistence when an LTE scheduler and an NR scheduler cannot support coordinated scheduling for UEs operating with an LTE RAT and for UEs operating with an NR RAT, respectively.

There is another need to support LTE and NR coexistence when an LTE scheduler and an NR scheduler can support coordinated scheduling for UEs operating with an LTE RAT and for UEs operating with an NR RAT, respectively.

There is another need to optimize support for LTE and NR coexistence when UEs capable of operating with an NR RAT are also capable for operating with an LTE RAT.

There is a need for a gNB to multiplex, over a common set of frequency resources and during a same time, control transmissions to UEs supporting a first service type using a first symbol duration for data transmission and to UEs supporting a second service using a second symbol duration for data transmissions.

There is another need for a UE to inform a gNB of a UE identity and of parameters for a transmission that is not configured by the gNB.

There is another need to support a transmission for a first service type during a first time slot without interfering with a transmission for a second service type during a second time slot that includes the first time slot.

There is another need to support a transmission for a first service type during a first time slot without interfering with another transmission for the first service type during the first time slot.

Finally, there is another need for a gNB to reduce a probability of collision between a non-configured transmission and a configured transmission and to reduce a probability of collision between two non-configured transmissions.

The present disclosure relates to supporting LTE and NR coexistence when an LTE scheduler and an NR scheduler cannot support coordinated scheduling for UEs operating with an LTE RAT and for UEs operating with an NR RAT, respectively. The disclosure also relates to supporting LTE and NR coexistence when an LTE scheduler and an NR scheduler can support coordinated scheduling for UEs operating with an LTE RAT and for UEs operating with an NR RAT, respectively. The disclosure further relates to optimizing support for LTE and NR coexistence when UEs capable of operating with an NR RAT are also capable for operating with an LTE RAT.

In some embodiments, the coexistence of LTE operation with NR operation is considered when an LTE scheduler and an NR scheduler are uncoordinated and a fixed partition of time-frequency resources on a cell applies over a period of SFs such as 10 SFs or 40 SFs. LTE operation and NR operation are restricted to occur only on corresponding LTE time-frequency resources and NR time-frequency resources. Mechanisms to support such coexistence need to be backward compatible for LTE UEs as LTE UEs are already deployed and changes to existing signaling mechanisms cannot be applicable. In the following, information related to signaling from an eNB to LTE UEs that is known by a gNB or information related to signaling from a gNB to NR UEs that is known by an eNB is assumed to be exchanged over respective interfaces between the eNB and the gNB and between the gNB and the eNB.

When an LTE scheduler and an NR scheduler cannot coordinate scheduling assignments per SF, such as for example when the schedulers need to operate independently due to being non-collocated and connected via interfaces of a backhaul with material latency, a dynamic BW utilization between NR operation and LTE operation is not practically feasible and a semi-static one can be preferable. A semi-static BW partition for a cell/carrier can be based on non-instantaneous traffic characteristics for NR UEs and LTE UEs. For example, an LTE scheduler and an NR scheduler can exchange buffer status reports for DL traffic and UL traffic for served LTE UEs and NR UEs, respectively, and a coordinating unit can indicate a BW partition for LTE operation and for NR operation. A resource partition can also extend to the time domain by configuring MBSFN SFs or ABS SFs for LTE operation.

For a cell BW partition in a manner that is compatible with existing LTE operation, the LTE scheduler can re-configure a cell BW by paging LTE UEs for a SI update and indicating a new LTE DL cell BW in an LTE MIB or a new LTE UL cell BW in an LTE SIB2. For example, for a DL cell BW of 20 MHz an LTE MIB can indicate an LTE DL cell BW of 10 MHz during a first time period and, after a relative increase of NR DL traffic or a decrease of LTE DL traffic, indicate an LTE DL cell BW of 5 MHz during a second time period. An NR DL cell BW is then 10 MHz during the first time period and 15 MHz during the second time period. In this manner, it is possible to minimize use of a DL cell BW for LTE operation and use the DL cell BW primarily for NR operation. For example, for a DL cell BW of 20 MHz, an LTE cell BW of 1.4 MHz can be indicated by an LTE MIB and parts or all of a remaining 18.6 MHz of BW can be allocated to NR operation. Then, the LTE DL cell BW can be used to provide synchronization, PBCH transmission, and communication support to LTE UEs or to NR UEs with capability to operate with LTE RAT, while all other functionalities can be provided by ab NR RAT on the NR DL cell BW.

When a gNB and NR UEs need to be informed of an LTE DL cell BW or of an LTE UL cell BW, as this can affect rate matching of DL transmissions to NR UEs to LTE signaling, such as CRS or CSI-RS, as is discussed in subsequent embodiments of this disclosure, this information can be provided to NR UEs by an NR MIB, or an NR SIB (or extended MIB), or by RRC signaling, or through a DCI format scheduling DL transmissions to NR UEs or informing of resources that DL transmissions to NR UEs are rate matched around. It is also possible that NR UEs can operate as LTE UEs and obtain the LTE DL cell BW through an LTE MIB.

Figure 10:
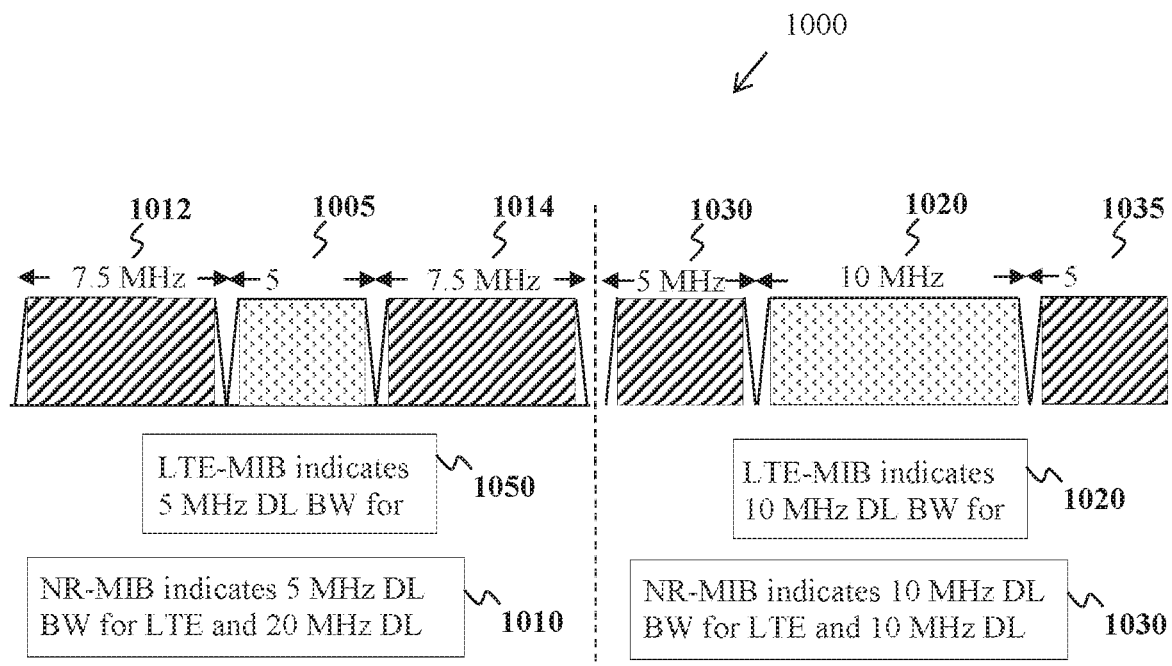
FIG. 10 illustrates an example adaptation of an LTE DL cell BW and associated signaling to LTE UEs and NR UEs according to embodiments of the present disclosure.

FIG. 10 illustrates an example adaptation 1000 of an LTE DL cell BW and associated signaling to LTE UEs and NR UEs according to embodiments of the present disclosure. An embodiment of the adaptation 1000 shown in FIG. 10 is for illustration only. Other embodiments may be used without departing from the scope of the present disclosure.

An LTE scheduler and an NR scheduler can exchange information via respective interfaces, such as for example buffer status reports for DL traffic, for LTE UEs and NR UEs, respectively, and an update for an allocation of a DL cell BW between an LTE DL cell BW and an NR DL cell BW can then be determined by a BW allocation controller. For example, during a first time period and for a DL cell BW of 20 MHz, an LTE MIB indicates 1050 an LTE DL cell BW of 5 MHz 1005. An NR MIB or an NR SIB (or NR enhanced MIB) also indicates 1010 an NR DL cell BW of 15 MHz that is equally divided in two parts of 7.5 MHz on each side of the DL cell BW 1012, 1014. Depending on a numerology (such as a symbol duration or a SC spacing and a CP length) used for transmissions to LTE UEs and on a numerology used for transmissions to NR UEs, guard bands may or may not be needed between an LTE DL cell BW and an NR DL cell BW. For example, when a same DL numerology is used between LTE and NR, guard-bands are not used; otherwise, guard-bands can be used (LTE numerology is predetermined, NR numerology can be indicated by MIB, SIB, or UE-specific higher layer signaling). After an update for a DL cell BW partition is determined by the controller, for example from 5 MHz to 10 MHz for an LTE DL cell BW, LTE UEs can be paged by an eNB and be informed by an LTE MIB 1020 of an LTE DL cell BW of 10 MHz 1025. NR UEs can also be paged by a gNB and be informed by an NR MIB 1030 of an NR DL cell BW of 10 MHz or NR UEs can be informed, explicitly or implicitly of an LTE DL cell BW of 10 MHz in a DL cell BW of 20 MHz through DL DCI formats scheduling DL transmissions to NR UEs. Then. NR UEs can determine that a 5 MHz BW is available for an NR DL cell BW on each side of the DL LTE cell BW 1032, 1034.

Several approaches can apply for indicating an NR DL cell BW. In a first example, an NR UE is informed, for example by (UE-specific or UE-common) higher layer signaling from a gNB, of a DL cell BW and of an LTE DL cell BW in the form of a reserved BW. Then, an NR UE can determine an NR DL cell BW as the remaining of the DL cell BW after excluding the reserved LTE DL cell BW. In a second example, in order to reduce a number of required bits, a DL cell BW and a reserved LTE DL cell BW can be jointly indicated subject to the LTE DL cell BW being smaller than the DL cell BW. In a third example, an NR UE is configured, for example by higher layer signaling, one or more BW parts of the DL cell BW that form the NR DL cell BW. The NR DL cell BW can be equally divided between the two ends of the DL cell BW. For a semi-static partition of a DL cell BW where an NR scheduler does not schedule DL transmissions to NR UEs in the LTE DL cell BW, NR UEs do not need to know that the LTE DL cell BW is used for LTE DL transmissions. However, as is subsequently described, for a dynamic partition of a DL cell BW where an NR scheduler schedules DL transmissions to NR UEs in the LTE DL cell BW, it can be beneficial for NR UEs to be aware that the additional DL cell BW is an LTE DL cell BW. Then, NR UEs can be informed of additional parameters for LTE transmissions such as a number of CRS antenna ports or a CSI-RS configuration as reserved resources where DL transmissions to NR UEs are rate matched around. For example LTE can have 1, 2, or 4 CRS antenna ports and a number can be indicated by 2 bits. For example, 5 bits can be used to indicate a CSI-RS configuration in LTE.

For a partition of time resources in a manner that is compatible to existing LTE operation, an MBSFN SF configuration or an ABS SFs configuration can apply for LTE operation. For example, 10 bits or 40 bits can be used for a MBSFN or ABS SFs configuration in LTE. For a TDD system having an UL/DL configuration. UL SFs without mapped timing for HARQ-ACK transmissions from LTE UEs, such as a third SF and an eight SF for UL/DL configuration 0, can be switched to DL SFs. Additional UL SFs can be switched to DL SFs for NR operation when an eNB does not schedule PDSCH transmissions to LTE UEs in DL SFs having an associated HARQ-ACK timing on the UL SFs and such DL SFs can also be used for NR operation. The LTE scheduler can then ensure absence of other UL transmissions in those UL SFs. A coordinating entity, such as a time resource controller, can indicate to an NR scheduler an availability of some or all of the configured MBSFN SFs or ABS SFs or DL SFs and UL SFs for a TDD system. A combination of FDM and TDM of LTE time-frequency resources and NR time-frequency resources can also apply.

Although DL transmissions to NR UEs can occur in MBSFN SFs or ABS SFs, such DL transmissions need to be rate-matched (or punctured) around sub-carriers or symbols used for CRS transmission and, for the case of MBSFN SFs, avoid the first one or two SF symbols that can be used for DL control signaling to LTE UEs. As a number of SF symbols used for DL control signaling to LTE UEs can vary per SF and an NR scheduler cannot be assumed to know this number prior to scheduling DL transmissions to NR UEs, for example when the NR scheduler and the LTE scheduler are not parts of a joint scheduler, the NR scheduler either needs to assume that a maximum number of SF symbols are used for DL control signaling to LTE UEs or a constraint on the maximum number can be enforced by a coordinating entity to the LTE scheduler and be informed to the NR scheduler. For example, without any coordination, an NR scheduler can assume that the maximum of two SF symbols are used for DL control signaling to LTE UEs in an MBSFN SF and three SF symbols are used in normal (non-MBSFN) SFs. For example, with coordination, a controller can limit a number of SF symbols used for DL control signaling to LTE UEs to be one in MBSFN SFs or two in normal SFs and inform the NR scheduler that all symbols in a MBSFN SF or in a normal SF except for the first one or first two ones, respectively, are available for DL transmissions to NR UEs. NR SI or UE-specific RRC signaling can inform NR UEs of a starting SF symbol for receptions of PDCCH transmissions or PDSCH transmissions in MBSFN SFs and of a starting SF symbol for receptions of PDCCH transmissions or PDSCH transmissions in non-MBSFN SFs. A gNB can obtain this information from an eNB through an interface.

When NR slot duration, such as 0.5 msec, is smaller than a SF duration, such as 1 msec, a first NR slot needs to be shortened to avoid interfering with a DL control region of two symbols in an LTE MBSFN SF while a following second NR slot does not need to be shortened. To enable a uniform NR slot duration, an NR slot can have a smaller number of symbols when NR slots are within a MBSFN SF. For example, for a MBSFN SF of 14 symbols and an NR slot of 7 symbols, a shortened NR slot of 6 symbols can be used and two shortened NR slots can exist in a MBSFN SF. For example, for a MBSFN SF of 14 symbols and an NR slot of 14 symbols, a shortened NR slot of 12 symbols can be used.

NR slot duration in the UL can be maintained at 7 symbols or 14 symbols. Similar considerations can also apply for other NR slot durations.

Figure 11:
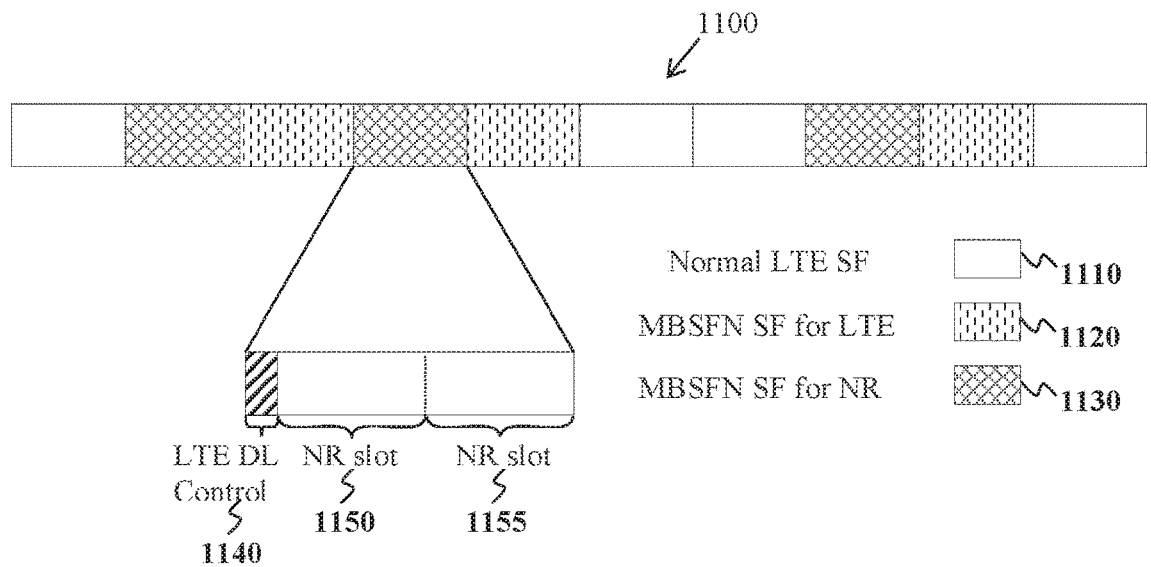
FIG. 11 illustrates an example use of LTE MBSFN SFs as NR slots according to embodiments of the present disclosure.

FIG. 11 illustrates an example use of LTE MBSFN SFs 1100 as NR slots according to embodiments of the present disclosure. An embodiment of the use of LTE MBSFN SFs 1100 shown in FIG. 11 is for illustration only. Other embodiments may be used without departing from the scope of the present disclosure.

A coordinating entity can determine a MBSFN SF (or ABS SF) configuration for LTE operation and configure a subset of MBSFN SFs as slots for NR operation. An LTE SIB, such as a SIB2, indicates a MBSFN SF configuration while an NR SIB indicates a MBSFN SF configuration that can be a subset of the one indicated by the LTE SIB. A set of SFs includes normal SFs 1110, MBSFN SFs for LTE 1120, and MBSFN SFs for NR 1130. The NR SIB can also inform an NR UE of a slot structure that excludes symbols used for DL control signaling to LTE UEs 1140 in MBSFN SFs and in normal SFs or for adjusting a length of an NR slot, for example from 7 symbols to 6 symbols or from 14 symbols to 12 symbols, in order to provide 2 NR slots, 1150 and 1155, with an equal number of symbols in MBSFN SFs.

When only MBSFN SFs are used for NR slots and NR UEs do not have a same DL timing as LTE UEs, for example when an eNB and a gNB are not collocated, at least one MBSFN SF is maintained as an NR slot in order for an NR gNB to transmit synchronization and SI signals. This also holds when not all NR UEs can operate with the LTE RAT. When DL transmissions to LTE UEs and NR UEs use a same numerology, it is also feasible for an NR gNB to use normal SFs to transmit synchronization and SI signals. An impact to LTE UEs can be avoided by the LTE scheduler (LTE eNB) being informed in advance through an interface from a coordinating entity of the time-frequency locations used by the gNB for transmission of synchronization and SI signals including control resources used for scheduling SI. Several different realizations of this information exchange can exist; for example, an eNB can directly indicate to a gNB through an interface the time-frequency locations or the reverse. The time-frequency locations for transmission of synchronization and SI signals to NR UEs may avoid the, fixed in the LTE system specifications, time-frequency locations used for transmission of CRS, primary synchronization signal/secondary synchronization signal (PSS/SSS), and PBCH to LTE UEs. The LTE scheduler can then avoid scheduling/configuring other transmissions to LTE UEs on the time-frequency locations used by a gNB to transmit synchronization and SI signals. For example, time locations for a gNB to transmit synchronization and SI signals may avoid symbols in a first SF or in a sixth SF per frame, such as the first 3 symbols, that can be used by an eNB to transmit DL control signaling, and the fifth, eighth, ninth, and twelfth symbols that can be used by an eNB to transmit CRS in normal SFs. Frequency locations may avoid the middle 72 SCs at least in symbols that can be used by an eNB to transmit synchronization or SI signals in the first SF per frame.

For UL transmissions from NR UEs, any UL SF can be used and the NR scheduler can be further informed though an interface of resources, including no resources, in each such UL SF that can be used for PUCCH or PRACH or SRS transmissions from LTE UEs. For example, 2 bits can indicate a SRS configuration, 5 bits can indicate a PRACH configuration, and a predetermined number of bits, such as 5 bits, can indicate a number of RBs reserved for PUCCH transmissions from each size of an UL BW. A BW controller can allocate remaining resources for LTE operation or for NR operation.

In some embodiments, the coexistence of LTE operation with NR operation is considered when an LTE scheduler and an NR scheduler are coordinated. Then, with some exceptions for predetermined time-frequency resources for LTE signaling such as for CRS, PSS/SSS and PBCH, all time-frequency resources on a cell can be dynamically used for NR operation per SF. Collisions among transmissions to or from LTE UEs and NR UEs can be avoided through coordination of an LTE scheduler and an NR scheduler. For example, the LTE scheduler and the NR scheduler can be coordinated by a same scheduling entity or be components of a same scheduler.

Similar to LTE and NR coexistence through a semi-static partition of time-frequency resources, coexistence is transparent to LTE UEs that are designed to operate without coexistence with an NR RAT also in case of dynamic resource partition. For NR operation, in order to improve resource utilization and make coexistence with LTE feasible in practice, a gNB needs to inform NR UEs for a presence of LTE signaling in respective time-frequency resources.

For synchronization signals and PBCH transmissions that exist in predetermined time-frequency resources, no additional signaling to NR UEs is needed as NR UEs can determine those time-frequency resources from NR SI that informs of: coexistence with an LTE RAT (1 bit—can also be implicit through a predetermined configuration of other parameters in NR MIB or NR SIB); a SFN and a SF number within a frame (synchronization signals and PBCH transmissions are in predetermined SFs per frame); and a DL cell BW (synchronization signals and PBCH transmissions are in the middle 6 RBs of the DL cell BW).

In case an LTE eNB support repetitions of synchronization or broadcast signaling in predetermined resources, this information can also be provided to a gNB and to NR UEs by the gNB through NR SI signaling. Moreover, NR SI can inform, for example using 2 bits, a number of CRS antenna ports and a cell identity associated with LTE operation in order for an NR UE to determine subcarriers used for CRS transmission as being reserved resources.

For LTE signaling that is not present but is configured by an eNB through SI signaling, corresponding configurations need to also be provided to a gNB and to NR UEs by the gNB through respective SI signaling or higher layer UE-specific signaling. Such configurations include: an UL carrier BW (UE-common configuration); an UL/DL configuration in case of a TDD system (UE-common configuration); an MBSFN SF configuration and a ABS configuration (UE-common configuration); CSI-RS configuration, including NZP CSI-RS and ZP CSI-RS (UE-common or UE-specific configuration); SRS configuration (for maximum transmission BW and SFs per frame—UE-common configuration); PRACH configuration (for transmission BW and SFs per frame—UE-common configuration); RBs and SFs per frame for EPDCCH, MPDCCH, PUCCH, and SPS transmissions (UE-specific configuration); and a maximum number of SF symbols used for PDCCH transmissions (UE-common configuration can be separate for normal SFs and MBSFN SFs—dynamic).

Some of the above configurations, such as the RBs for SPS PDSCH, EPDCCH, or MPDCCH transmissions, are UE-specific while other configurations, such as the MBSFN SF configuration or the PRACH configuration, are UE-common. Further some configurations, such as a number of SF symbols used for LTE PDCCH transmissions, can be dynamic per SF unless the number of SF symbols used for LTE PDCCH transmission is implicitly configured by indicating a maximum number of symbols for PHICH transmission in the LTE-MIB. When LTE DL transmissions and NR DL transmissions are scheduled by a common scheduler or by coordinated schedulers, a number of SF symbols used for LTE PDCCH transmissions, or equivalently a start symbol for DL transmissions to NR UEs, can be dynamically informed to NR UEs per applicable slot either through a UE-common DCI format or through a DCI format scheduling a PDSCH transmission to an NR UE; otherwise, a number of LTE SF symbols used for LTE PDCCH transmissions in normal SFs or MBSFN SFs can be signaled in an NR SI or can be assumed to be a maximum one such as 3 SF symbols.

When NR UEs can process (understand) configurations for LTE UEs, above referenced configurations that are UE-common can be informed to NR UEs by a gNB through NR SI in a same manner as they are informed to LTE UEs by an eNB through LTE SI. As is subsequently discussed, when NR UEs can operate as LTE UEs, NR UEs can establish an RRC connection with an eNB prior to declaring their capability to operate as NR UEs. In such case, NR UEs can synchronize to the eNB and obtain LTE SI for UE-common configurations from the eNB.

A gNB can inform NR UEs of LTE configurations that are UE-specific by NR SI as a super-set of the UE-specific configurations. For example, when a first LTE UE is configured RBs with indexes 0 through 3 for receiving EPDCCH transmissions and a second UE is configured RBs with indexes 8 through 11 for receiving EPDCCH transmissions, an NR UE can be informed by NR SI or by LTE SI that RBs with indexes 0 through 3 and 8 through 11 are reserved resources (as they are used for EPDCCH transmissions to LTE UEs). For example, when a first LTE UE is configured with a first CSI-RS configuration and a second UE is configured with a second CSI-RS configuration, NR SI can signal that both first CSI-RS configuration and second CSI-RS configuration are reserved resources (as they are used for LTE UEs). RBs used for LTE PUCCH transmissions can vary per SF, depending for example on a number of resources used for HARQ-ACK transmissions per SF, and an NR SI can indicate a number of RBs from each side of the UL cell BW that NR UEs can assume as being unavailable (reserved resources) for transmissions from NR UEs (and as being used for PUCCH transmissions from LTE UEs) when LTE UEs and NR UEs share a same UL cell BW. NR SI can also indicate a combination of time-frequency resources that NR UEs may assume as being unavailable (reserved resources) for transmissions to or from NR UEs, for example by indicating a set of RBs per SF within a number of frames such as one or four frames. For example, a set of RBs can be indicated as used for SPS transmissions from LTE UEs in a first SF of a frame but not in remaining SFs of the frame. When NR UEs can operate as LTE UEs, the above configurations can also be included in LTE SI, such as in SIB2, instead of transmitting a separate NR SI.

When NR UEs cannot process (understand) configurations for LTE UEs, or even when NR UEs can process configurations for LTE UEs, NR SI or LTE SI can indicate a set of time-frequency resources that are unavailable (reserved resources) for transmissions to or transmissions from NR UEs without indicating what channels or signals associated with LTE UEs use those resources. For example, NR SI or LTE SI can indicate a set of RBs of a DL cell BW or of an UL cell BW as being unavailable and this can be applicable to all SFs. For example, NR SI or LTE SI can indicate a set of RBs of a DL cell BW or of an UL cell BW as being unavailable separately per SF in a number of SFs such as per SF in a frame or per SF in four frames and this enables, for example, indication for middle 6 RBs as being unavailable only in SFs where PBCH is transmitted. For example, NR SI or LTE SI can indicate a set of DL SF symbols or a set of UL SF symbols as being unavailable separately per SF in a number of SFs such as per SF in one NR frame or per SF in four NR frames. An NR UE, upon receiving a scheduling assignment to receive or a scheduling grant to transmit in time-frequency resources that at least partially overlap with time-frequency resources indicated by NR SI or LTE SI as being unavailable, can rate match or puncture the respective reception or transmission.

Coexistence of LTE and NR operation on the UL can generally be supported by scheduler implementation. When an LTE UL cell BW is defined separately from an UL cell BW, frequency resources that are not available to NR UEs (reserved resources), or equivalently frequency resources that are available to NR UEs, can be signaled in an NR SI or by UE-specific higher layer signaling in terms of RBs. For example, an NR SI can signal a number of RBs for an LTE UL cell BW (reserved RBs) relative to an UL cell BW and, to minimize SI overhead as LTE PUCCH resources are located on each end of the LTE UL cell BW, the NR SI can signal only a number of RBs relative to one end of the LTE UL cell BW. NR UEs can interpret that a same number of RBs is also unavailable (reserved) from the other end of the LTE UL cell BW or those RBs can also be explicitly configured to NR UEs, for example by SI or by UE-specific higher layer signaling, as reserved RBs. For example, for an UL cell BW of 100 RBs, an NR SI can signal an UL cell BW of 50 RBs, such as the middle 50 RBs. and also signal that 10 RBs are unavailable (reserved). An NR UE can determine that RBs with indexes 0 through 4 and RBs with indexes 46 through 50 are unavailable for transmissions from the NR UE. UL SFs that are not available for NR transmissions can be signaled in terms of SFs. For example, a bit-map of 10 bits can indicate (available for LTE transmissions and available for NR transmissions) UL SFs per frame. Instead of signaling unavailable UL time-frequency resources, an NR SI can signal available time-frequency resources in a complementary manner. To avoid collisions with SRS transmissions from LTE UEs, an NR SI can signal a set of SFs per number of frames where NR UEs may not transmit on a last SF symbol (SRS configuration), or an UL DCI scheduling a PUSCH transmission from an NR UE can include a 1-bit field indicating whether or not the NR UE may transmit PUSCH in one or more last SF symbols or can indicate a duration for the PUSCH transmission that excludes the last one or more SF symbols.

When an NR UE does not first establish a RRC connection as an LTE UE through a use of LTE synchronization signals, SI, and random access procedure, corresponding functionalities need to be separately provided by a gNB. This is applicable to either dynamic resource sharing with LTE in case of coordinated schedulers or to semi-static resource sharing in case of uncoordinated schedulers. NR synchronization signals and first NR SI (NR MIB) need to be transmitted prior to second NR SI (NR SIB) informing NR UEs of available DL frequency resources. DL frequency resources for the NR synchronization signals and the first NR SI, such as a PBCH conveying an NR-MIB, can include RBs of a DL cell BW other than the middle 6 RBs used for transmitting LTE synchronization signals and PBCH. For a more robust NR and LTE coexistence that avoids any long-term scheduling impact to LTE UEs, such as an inability to semi-statically assign RBs for SPS PDSCH, EPDCCH, or MPDCCH transmissions, and avoids any forward compatibility restrictions to LTE operation. DL frequency resources for the NR synchronization signals and the first NR SI not only need to avoid the middle 6 RB of the DL cell BW but also need to avoid all RBs corresponding to the LTE DL cell BW. Therefore a frequency location of synchronization signals and first SI signals for NR UEs needs to be flexible, for example to avoid an LTE DL cell BW that can have a varying number of RBs.

NR PBCH transmissions can occur in a same BW as the BW for transmission of NR synchronization signals or in a different BW that can be determined by information included in the NR synchronization signals. NR PBCH can convey an NR MIB that can include an indication of an NR DL cell BW (DL cell BW excluding the LTE DL cell BW). The NR DL cell BW can be indicated by indicating a DL cell BW, such as 20 MHz. and also indicating an excluded DL cell BW (the LTE DL cell BW), such as 10 MHz, that NR UEs interpret as being located in the middle of the 20 MHz. The DL cell BW and the LTE DL cell BW can be separately indicated or, in order to reduce a number of required bits, be jointly indicated subject to the LTE DL cell BW being smaller than the DL cell BW. The NR DL cell BW can also be directly indicated, without considering an LTE DL cell BW, by indicating, for example by NR SI, additional BW relative to the BW of the transmission of NR synchronization signals or PBCH.

Once an NR UE determines an NR DL cell BW, the NR UE can monitor PDCCH on one or multiple parts of the NR DL cell BW for scheduling PDSCH that conveys other SI. The PDCCH can be monitored at least in slots where the NR synchronization signals or the NR PBCH are transmitted. Instead of including an indication of a DL cell BW and of NR DL cell BW, the NR MIB can include scheduling information, such as RBs and TB size for NR SI transmission or RBs for PDCCH transmissions scheduling NR SI, for an NR SI and the NR DL cell BW can be conveyed by the NR SI. The RBs of the NR SI or of the PDCCH transmission scheduling the NR SI can be indicated relative to the RBs for transmission of NR synchronization signals or NR PBCH and can be, for example, symmetrically placed or placed with an offset from a set of predetermined offsets. For example, an offset can be relative to the middle of the BW used for transmission of NR PBCH or synchronization signals. A similar indication can apply for slots or slot symbols and can be relative to a last symbol used for transmission of synchronization signals and NR PBCH. The LTE DL cell BW can be available to NR UEs in at least some of the SFs indicated as MBSFN SFs to LTE UEs and an NR SI can indicate such MBSFN SFs in addition to indicating MBSFN SFs.

To expedite a synchronization and SI acquisition process, an NR UE that is also capable of operating as an LTE UE can attempt to detect both LTE synchronization and MIB/SIB signals and NR synchronization and MIB/SIB signals. When an NR UE detects LTE synchronization and MIB/SIB signals, the NR UE can determine an LTE DL cell BW and can be informed by LTE SI whether there is an NR DL cell BW. The NR UE can then proceed to detect NR synchronization signals in frequency locations that are, for example, outside the LTE DL cell BW and expedite the associated process for establishing an RRC connection for NR operation.

Figure 12:
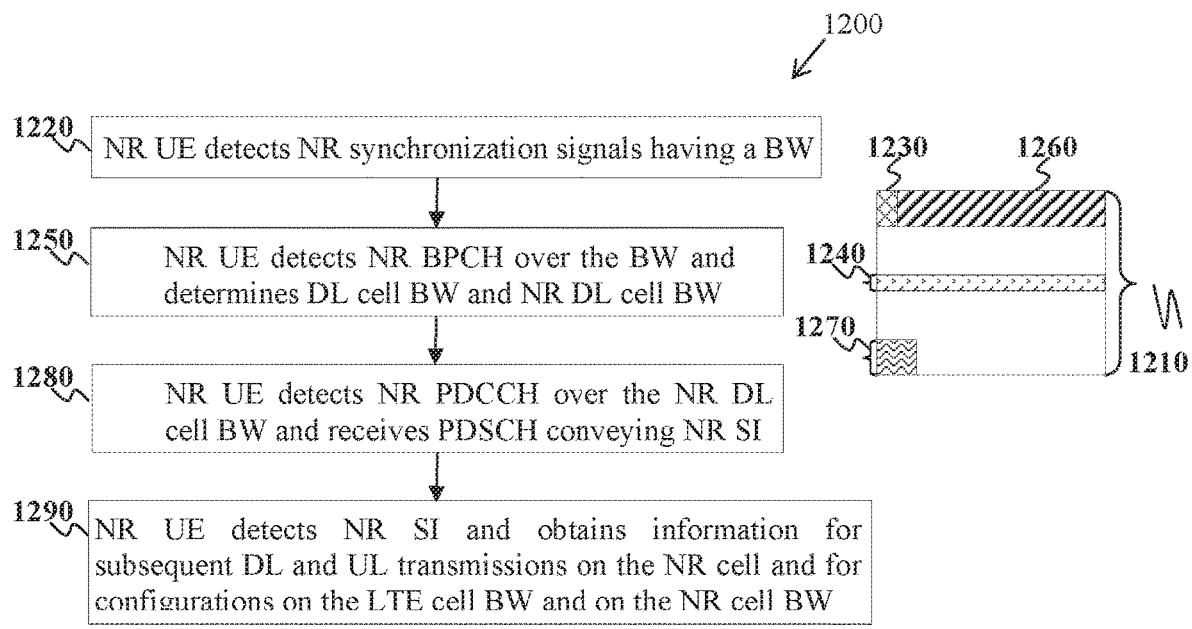
FIG. 12 illustrates an example process for an NR UE to synchronize and obtain SI on a cell supporting LTE and NR coexistence according to embodiments of the present disclosure.

FIG. 12 illustrates an example process 1200 for an NR UE to synchronize and obtain SI on a cell supporting LTE and NR coexistence according to embodiments of the present disclosure. An embodiment of the process 1200 shown in FIG. 12 is for illustration only. Other embodiments may be used without departing from the scope of the present disclosure.

On a cell having a DL cell BW 1210, an NR UE detects NR synchronization signals having a predetermined BW at step 1220. The synchronization signals are transmitted in one or more symbols of a SF 1230 and the BW location of the synchronization signal does not overlap with the middle 6 RBs 1240 of the DL cell BW. After detecting the NR synchronization signals, the NR UE detects an NR BPCH at step 1250 that is transmitted in other symbols of the SF and over the same BW as the NR synchronization signals 1260, an NRNR DL control signaling 1270 can be transmitted in NR DL cell BW that does not include transmission of NR synchronization signals and NR PBCH. After detecting the NR MIB, an NR UE can determine the NR DL cell BW and proceed with a detection of NR PDCCH scheduling PDSCH that convey NR SI at step 1280 and are transmitted in a BW and symbols indicated respectively in NR MIB through an offset relative to the BW of synchronization signals and NR MIB and an offset relative to a last symbol of synchronization signals and NR MIB transmissions. The NR UE can then obtain information for an NR UL cell BW and for configurations for DL transmissions and for UL transmissions on the LTE cell BW and on the NR cell BW at step 1290.

Figure 13:
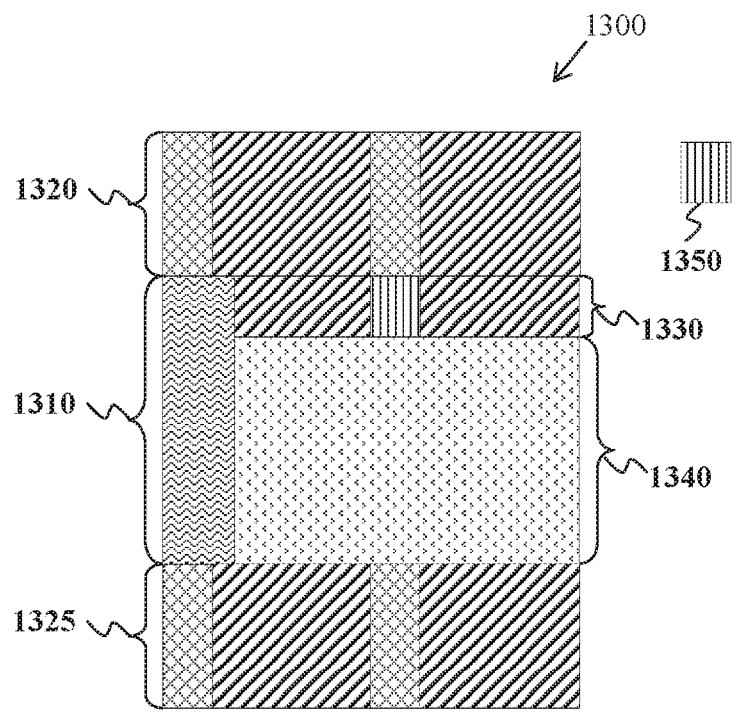
FIG. 13 illustrates an example structure for LTE and NR coexistence in a DL cell 13W according to embodiments of the present disclosure.

FIG. 13 illustrates an example structure 1300 for LTE and NR coexistence in a DL cell BW according to embodiments of the present disclosure. An embodiment of the structure 1300 shown in FIG. 13 is for illustration only. Other embodiments may be used without departing from the scope of the present disclosure.

When schedulers for NR DL transmissions and for LTE DL transmissions are coordinated. LTE DL cell BW can be used for NR transmissions. However, NR DL cell BW cannot be used for LTE transmissions at least for UE supporting existing LTE functionalities. DL control signaling for LTE UEs is transmitted over the LTE DL cell BW 1310 and can have a different duration than DL control signaling for NR UEs that is transmitted over an NR DL cell BW 1320, 1325. An NR UE can be informed of the duration for LTE DL control signaling either through a UE-common DCI format or through a UE-specific DCI format such as for example a DCI format scheduling a PDSCH transmission to the NR UE and the NR UE can start PDSCH reception after a last symbol for LTE DL control signaling. NR UEs can be scheduled PDSCH transmissions on the NR DL cell BW but also on the LTE DL cell BW 1340 when LTE UEs are scheduled PDSCH transmissions only in a part of the LTE DL cell BW 1340. When an NR transmission slot duration is smaller than an LTE SF duration, such as for example when an NR slot duration is 0.5 msec while an LTE SF duration is 1 msec, multiple NR transmission slots can exist within an LTE SF. In a second transmission slot for NR UEs during an LTE SF, NR DL control signaling can be transmitted either only in the NR DL cell BW or also include available LTE DL cell BW when there is a UE-common DCI format transmission in the previous NR slot that informs of a number of symbols for LTE DL control signaling in the LTE SF 1350. The tradeoffs are that the former approach is robust to miss-detection errors of the UE-common DCI format in the previous NR transmission slot and maintains a same structure for the DL control signaling regardless of an availability of an LTE DL cell BW for NR transmissions while failing to utilize an available LTE DL cell BW for NR DL control signaling. An NR UE receiving a PDSCH transmission in part of an LTE DL cell BW needs to be aware of a number of CRS antenna ports used by the LTE eNB and of a respective cell identity and of CSI-RS configurations in the SF in order to rate match or puncture the PDSCH reception in corresponding SCs. This information of reserved resources can be provided to the NR UE by NR SI or by UE-specific higher layer signaling. An NR UE needs to also be aware of the SF number as this can determine presence of LTE synchronization signals and PBCH transmissions and corresponding rate matching or puncturing of sub-carriers associated with a PDSCH transmission can then also apply.

In some embodiments, a UE capable of operating either as an LTE UE or as an NR UE can dynamically switch an operation mode per SF. Additionally, a cell supporting LTE UEs and NR UEs can dynamically switch a use of a DL cell BW to serve only NR UEs or to serve both NR UEs and LTE UEs and can dynamically switch a use of an UL BW to serve only NR UEs or to serve only LTE UEs or both. This can be beneficial when DL traffic or UL traffic can vary materially per SF. For example, for operation in small cell environments where a small number of UEs, such as one to three UEs, is scheduled per SF and with high probability the UEs can happen to be only NR UEs or only LTE UEs.

A UE capable of operating either as an LTE UE or as an NR UE can establish an RRC connection with an LTE eNB as an LTE UE. The UE can declare to the eNB the UE's capability to operate with the NR RAT, for example by using an NR-specific PRACH resource (indicated by SI), or in Msg3 of a random access process, or by higher layer signaling after establishing an RRC connection with the eNB. When all NR UEs are capable of operating both as LTE UEs and as NR UEs, at least for establishing an RRC connection with an eNB, a gNB does not need to transmit NR synchronization signals or SI signals such as NR PBCH or NR SIBs and an NR UE can perform a random access procedure as an LTE UE. Upon establishing an RRC connection, or prior to establishing an RRC connection, an NR capable UE can be informed of additional available NR DL cell BW or NR UL cell BW that is not visible to UEs capable of operating only as LTE UEs. For example, for a DL cell BW of 20 MHz, an LTE MIB can indicate an LTE DL cell BW of 10 MHz for LTE-only capable UEs and NR-capable UEs can be informed of an existence of an additional 10 MHz of NR DL cell BW that is symmetrically placed, in two BW components of 5 MHz each, around the 10 MHz LTE DL cell BW indicated by the LTE MIB. The NR UEs can be informed of the NR DL cell BW or of the NR UL cell BW either through spare bits in the LTE MIB, or through an LTE SIB such as a SIB2, or by UE-specific RRC signaling, or by NR SI. NR UEs can also be configured by system specification to monitor a different SI-RNTI than LTE UEs, for example a SI-RNTI value for NR UEs can be different than the SI-RNTI value of 65535 (0xFFFF) for LTE UEs.

An NR UE can differentiate the NR UE's operation relative to an LTE UE after establishing an RRC connection with an eNB but can also maintain operational commonalities with an LTE UE. For example, an NR UE can maintain the following LTE functionalities. In one example, the NR UE maintains use of a CRS transmitted from an eNB only on the LTE DL cell BW to perform RSRP measurements for mobility and UL power control (a CRS transmission power can be provided by NR SI) or for receiving PDSCH with a CRS-based transmission mode while a gNB does not transmit CRS in the NR DL cell BW. In another example, the NR UE maintains PCFICH detection per SF to determine a number of symbols for DL control signaling transmission to LTE UEs. In yet another example, the NR UE maintains PDCCH monitoring on the LTE DL cell BW according to the following two design alternatives.

A PDCCH transmission scheduling a PDSCH transmission to an NR UE or a PUSCH transmission from an NR UE can be located either on the LTE DL cell BW or on the NR DL cell BW in order to balance DL control signaling overhead between the LTE DL cell BW and the NR DL cell BW and improve resource utilization. According to a capability for a number of PDCCH decoding operations per SF, an NR UE can be configured a first set of PDCCH candidates for respective CCE aggregation levels on the NR DL cell BW and a second set of PDCCH candidates for respective CCE aggregation levels on the LTE DL cell BW. For example, the first set of candidates can be used for scheduling NR transmissions using a first DCI format size on the NR cell while the second set of candidates can be used for scheduling LTE transmissions using a second DCI format size on the NR cell for the UE. The partitioning of a number of PDCCH decoding operations a UE can perform per slot or SF can be indicated, for example, to the gNB by the eNB. The eNB or the gNB can then respective configure to the NR UE a first number of LTE PDCCH decoding operations per LTE CCE aggregation level per LTE cell and per LTE DCI format size and a second number of NR PDCCH decoding operations per NR CCE aggregation level per NR cell and per NR DCI format size. When there are multiple NR slots within a SF, an NR UE can operate with all PDCCH candidates being located on the NR DL cell BW for each NR slot other than a first NR slot per SF, or be configured with a third number of NR PDCCH decoding operations per NR CCE aggregation level per NR cell and per NR DCI format size when the UE does not perform LTE PDCCH decoding operations. Therefore a configuration for a number of PDCCH decoding operations for a UE to perform for PDCCH transmissions from a gNB can be time varying.

On an NR DL cell BW, an NR UE can operate with one or more of the following characteristics: without presence of CRS; with variable NR transmission duration, for example ranging from a sub-multiple of a SF in a number of SF symbols such as 7 SF symbols, to a multiple of the SF in a number of SF symbols such as 28 SF symbols: without presence of DL control region at the beginning of at least some NR slots; without transmission of PCFICH or PHICH; and with independent configurations of MBSFN SFs or ABS SFs.

An NR UE can be scheduled reception for a PDSCH transmission in a BW that includes RBs both from the LTE DL cell BW and the NR DL cell BW. Rate matching, or puncturing, can apply to SCs of the PDSCH transmission located in the LTE DL cell BW and used for default LTE transmissions such as CRS, or PSS/SSS, or PBCH transmission and the same can apply to SCs used for configured LTE transmissions when such SCs are informed to NR UEs though SI or UE-specific higher layer signaling. A resource allocation field in DCI formats scheduling a PDSCH transmission to an NR UE can address RBs over all DL cell BW that includes the LTE DL cell BW and the NR DL cell BW. A CSI-RS transmission for NR UEs can be over all DL cell BW while a CSI-RS transmission for LTE UEs is only over the LTE DL cell BW. Different DMRS or CSI-RS structures can be used for transmission on the LTE DL cell BW and on the NR DL cell BW. For example, the DMRS or CSI-RS structure on the LTE DL cell BW can be same as for LTE UEs while the DMRS or CSI-RS structure on the NR DL cell BW can be based on a CAZAC sequence or a different PN sequence.

Figure 14:
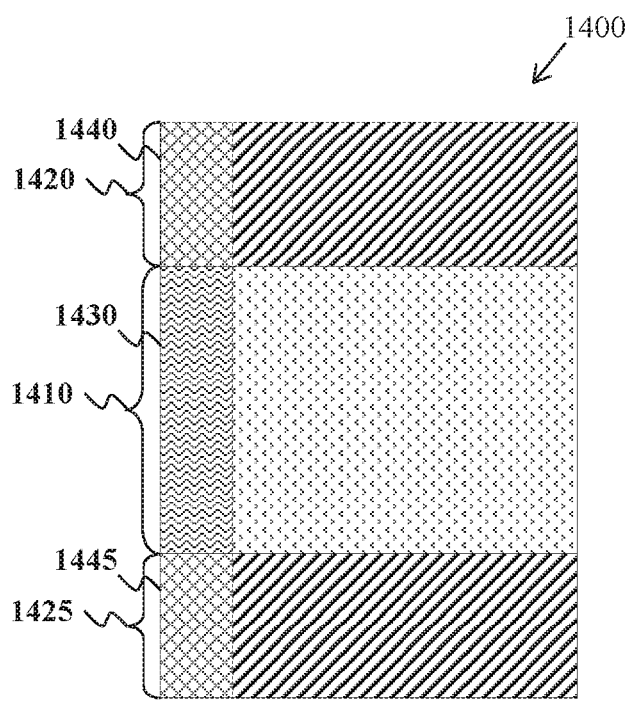
FIG. 14 illustrates an example hybrid operation for an NR UE using an LTE DL cell BW and an NR DL cell BW according to embodiments of the present disclosure.

FIG. 14 illustrates an example hybrid operation 1400 for an NR UE using an LTE DL cell BW and an NR DL cell BW according to embodiments of the present disclosure. An embodiment of the hybrid operation 1400 shown in FIG. 14 is for illustration only. Other embodiments may be used without departing from the scope of the present disclosure.

An NR UE establishes an RRC connection with an eNB as an LTE UE. The NR UE is informed of an LTE DL cell BW 1410 through an LTE MIB and of an LTE UL cell BW through an LTE SIB2. The NR UE declares the NR UE's capability for NR operation to the eNB. The NR UE is subsequently configured for operation on additional DL cell BW referred to as NR DL cell BW 1420, 1425. For example, the NR DL cell BW can include two BWs with equal size that are located on each side of the LTE DL cell BW. It is also possible for the NR DL cell BW to instead include two BWs with unequal size that are located on each side of the LTE DL cell BW or a single BW that is located on one side of the LTE DL cell BW or be a BW of a different carrier. The NR DL cell BW does not include transmission of CRS. PBCH, SI, a physical control format indicator channel (PCFICH), or a physical H-ARQ indicator channel (PHICH). A PDCCH transmission for an NR UE can be located on the LTE DL cell BW 1430 or on the NR DL cell BW (both parts, when configured) 1440, 1445. An NR UE can be scheduled PDSCH reception on any set of RBs of the DL cell BW and the set of RBs can include RBs in the LTE DL cell BW and RBs in the NR DL cell BW.

As an LTE UE can be independently configured an LTE DL cell BW and an LTE UL cell BW, the LTE UL cell BW can include all UL cell BW and a configuration of a separate NR UL cell BW to NR UEs is not required. For example, a PUCCH region for LTE UEs can be placed on the two ends of the UL cell BW and the middle of the UL cell BW can be used for PUSCH, physical random access channel (PRACH), or SRS transmissions from LTE UEs or NR UEs.

When an NR UL cell BW is defined (similar to an NR DL cell BW), an NR UE can operate: without PUCCH resources configured by higher layer signaling (can be shared, when needed, with LTE PUCCH resources); without PRACH resources configured by higher layer signaling (can be shared with LTE PRACH resources); and with SRS transmissions that are not contiguous in BW to avoid an LTE UL cell BW.

An NR UE can dynamically switch operation between an LTE mode and an NR mode. This can be beneficial in several cases such as for enabling multi-user MIMO with LTE-only capable UEs, or for enabling dynamic switching of transmission from or transmission to an eNB that can serve a macro-cell or a gNB that can serve a pico-cell, or for enabling robust fallback operation as a reception reliability using a CRS-based PDSCH transmission mode can be higher than a reception reliability using a DMRS-based PDSCH transmission mode. To enable dynamic switching of operation for NR UEs between an LTE RAT and an NR RAT, in a first example an NR UE can be configured to monitor both an LTE-based DCI format and an NR-based DCI format. In a second example, to avoid potentially increasing a number of PDCCH decoding operations an NR UE needs to perform per NR slot, the NR UE can be configured to decode a single DCI format that can include an "operation mode" or "RAT mode" field (IE) of 1 bit that indicates an LTE-based transmission mode or an NR-based transmission mode for an associated PDSCH or PUSCH. The remaining fields of the DCI format can be interpreted according to the indicated transmission mode where an interpretation of some fields, such as a RB allocation field or a HARQ process number field or a TPC command field, can remain same in both transmission modes while an interpretation of other fields that are applicable only for LTE operation or only for NR operation can change. A slot structure, such as for example a DMRS location and structure including a presence or absence of DMRS, can also change depending on the operation mode.

Figure 15:
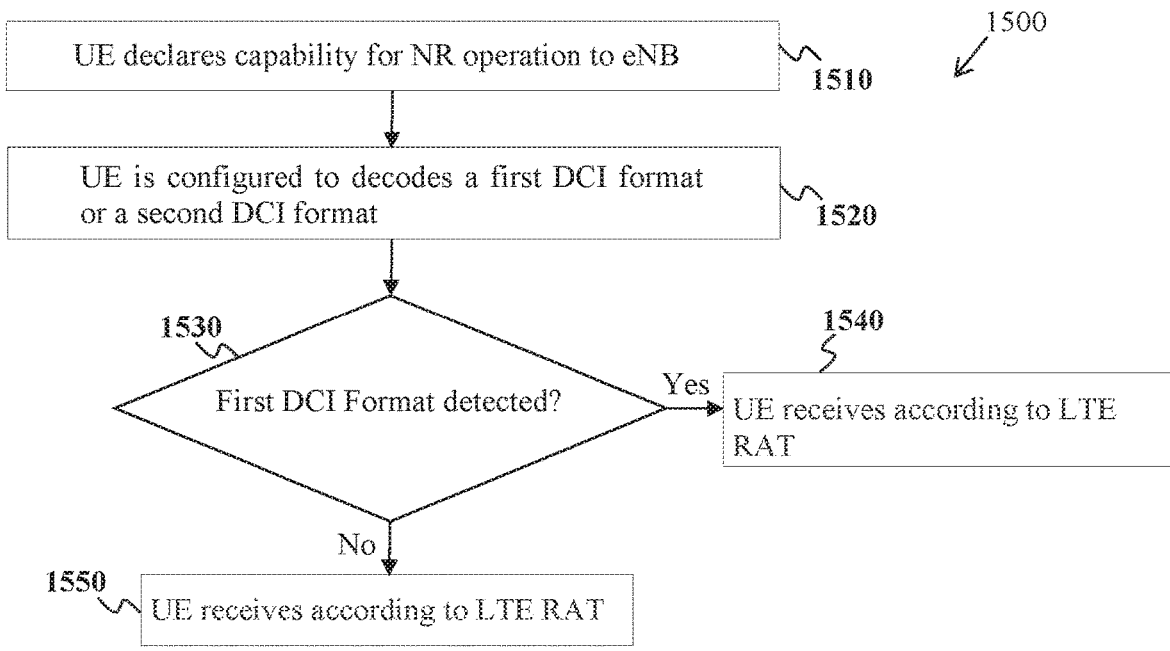
FIG. 15 illustrates an example process for an NR determine whether receive a PDSCH using a first transmission structure based on an LTE RAT or using a second transmission structure based on an NR RAT according to embodiments of the present disclosure.

FIG. 15 illustrates an example process 1500 for an NR UE to determine whether to receive a PDSCH using a first transmission structure based on an LTE RAT or using a second transmission structure based on an NR RAT according to embodiments of the present disclosure. An embodiment of the process 1500 shown in FIG. 15 is for illustration only. Other embodiments may be used without departing from the scope of the present disclosure.

A UE establishes an RRC connection with an eNB and declares a capability to operate according to an NR RAT at step 1510. The UE is then configured by the eNB to decode a first DCI format associated with reception of a PDSCH transmission or with a PUSCH transmission according to a first RAT, such as LTE, and a second DCI format associated with reception of a PDSCH transmission or with a PUSCH transmission according to a second RAT, such as NR. The UE decodes a first DCI format or a second DCI format at step 1520. The first DCI format and the second DCI format can have a different size or can have a same size and be differentiated by a "RAT mode" field. The UE determines whether the UE detected the first DCI format or the second DCI format at step 1530. When the UE detects the first DCI format, the UE receives a PDSCH (or transmits a PUSCH) according to a first RAT such as LTE at step 1540. When the UE detects the second DCI format, the UE receives a PDSCH (or transmits a PUSCH) according to a second RAT such as NR at step 1550.

The present disclosure additionally relates to supporting a transmission for a first service type during a first time slot without interfering with a transmission for a second service type during a second time slot that includes the first time slot. The present disclosure also relates to supporting a transmission for a first service type during a first time slot without interfering with another transmission for the first service type during the first time slot. The present disclosure additionally relates to a gNB reducing a probability of collision between a non-configured transmission and a configured transmission and to reduce a probability of collision between two non-configured transmissions. The present disclosure further relates to a gNB multiplexing, over a common set of frequency resources and during a same time, control transmissions to UEs supporting a first service type using a first symbol duration for data transmission and to UEs supporting a second service using a second symbol duration for data transmissions. The present disclosure also relates to a UE to informing a gNB of a UE identity and of parameters for a transmission that is not configured by the gNB.

An embodiment considers spectrum access means for UEs supporting a first service type, such as URLLC service, and for UEs supporting a second service type, such as eMBB service. A UE supporting the first service type transmits over a time slot having a first duration and a UE supporting the second service type transmits over a time slot having a second duration where the second duration is larger than the first duration. For example, the first slot duration can be 0.1 msec while the second slot duration can be 0.5 msec.

When a second UE supporting the second service type has an ongoing second transmission during a slot with the second duration and a first UE supporting the first service type needs to start a first transmission during a slot of a first duration that is within the slot of the second duration, a collision of the two transmissions occurs when respective BWs at least partially overlap. To avoid such a collision, the first UE can apply a listen-before-talk (LBT) type mechanism over an operating BW and select a transmission BW based on the LBT result. When the first UE needs to transmit over a BW of T RBs in an operating BW of N RBs, the first UE can select the T RBs as the ones having a measured received power that is the smaller than in the remaining N−T RBs. In this sense, a clear channel assessment (CCA) is different than a typical CCA in that a UE does not determine whether or not a received power is below a threshold over a system BW but instead determines a part of the system BW, or of a configured portion of the system BW, where a received power has a low value. Certain RBs, such as RB that can be used for PUCCH transmissions, can be excluded. Additionally, there can be restrictions in the first RB used for a transmission or in the number of RBs used for a transmission as it is further subsequently described in order to facilitate detection of the transmission at a gNB. For example, the first RB can be restricted to be a first RB every five RBs as the RBs are enumerated over an operating BW or over regions of an operating BW that may be configured for UE transmissions that are not configured by the gNB (autonomous UE transmissions).

In order to avoid collisions in accessing the channel medium with other UEs having the first service type, the first UE can transmit a reservation signal at least over the BW that the first UE determines for a subsequent transmission. The duration for the transmission of the reservation signal can be from the time the first UE determines the BW for the subsequent transmission until the beginning of a transmission slot for the first service type. Then, other UEs sensing the channel medium to determine a BW with low interference for subsequent transmissions will avoid the BW determined by the first UE for the UE's transmission as the other UEs will sense a high interference in that BW.

When a non-configured transmission from a UE for a first service type over a first time slot interferes with ongoing transmissions from other UEs for a second service type over a second time slot, a gNB can mitigate an impact from the interference from the first service type by estimating and subtracting the interference from a received signal over the first time slot. As the gNB typically receives the non-configured transmission for the first service type with a large power associated with a high detection reliability, the gNB can perform interference cancellation of the non-configured transmission for the first service type from the ongoing transmissions for the second service type by detecting, regenerating, and subtracting a signal corresponding to the first service type from the received signal.

Figure 16:
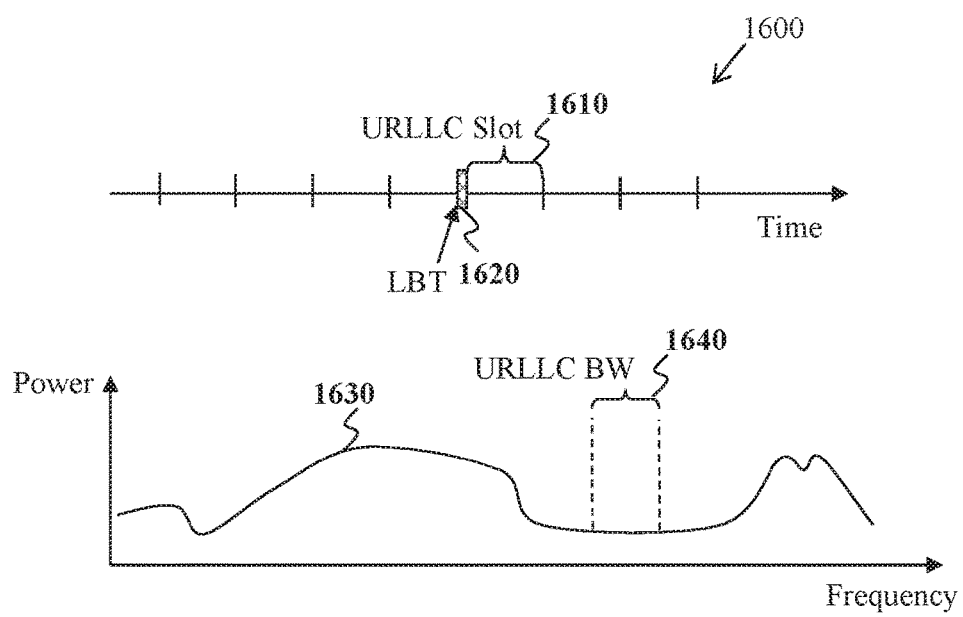
FIG. 16 illustrates an example process for a UE supporting a first service type to determine a transmission BW according to embodiments of the present disclosure.

FIG. 16 illustrates an example process 1600 for a UE supporting a first service type to determine a transmission BW according to embodiments of the present disclosure. An embodiment of the process 1600 shown in FIG. 16 is for illustration only. Other embodiments may be used without departing from the scope of the present disclosure.

A UE supporting a first service type, such as URLLC service, determines a time slot 1610 and prior to the time slot performs an LBT 1620 to determine a power density profile 1630 for other transmissions over a BW. The BW can be the entire operating system BW or a BW that a serving gNB configures to the UE by higher layer signaling or by physical layer signaling. In the latter case, it is possible for a network to also apply frequency domain inter-cell interference coordination (ICIC) and provide a level of protection for the configured BW from inter-cell interference. Based on the measurement of the power profile, the UE selects a BW 1640 to transmit during the time slot.

A determination of a transmission power by a UE can be enhanced in order to account for potential presence of interference. The UE can be configured by a serving gNB with an interference power reference value, $P_{int,0}$, for the UE to incorporate in the determination of the transmission power. As an outcome of the LBT, or at a somewhat earlier time instance, the UE measures an interference power, $P_{int,meas}$, over a transmission BW. When $P_{int,meas} \leq P_{int,0}$, the UE determines a PUSCH transmission power as in Equation 1 while when $P_{int,meas} > P_{int,0}$, the UE increases a transmission power by $P_{int,meas} - P_{int,0}$. Therefore, to account for the presence of interference, particularly from UEs supporting the second service type that has lower transmission priority than the first service type, the UE can add the term min(0, $P_{int,meas} - P_{int,0}$) in a formula, for example such as the one in Equation 1, and the UE can determine a transmission power as in Equation 2 given by:

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) + \min(0, P_{int,meas} - P_{int,0}) \end{Bmatrix} [\text{dBm}]. \qquad \text{Equation (2)}$$

A gNB can separately/independently configure values of $P_{O\_PUSCH,c}(j)$ and $\alpha_c(j)$ depending on a service type. For example, the gNB can configure a larger value for $P_{O\_PUSCH,c}(j)$ for URLLC service relative to eMBB service when the former requires higher reliability. For example, the gNB can configure $\alpha_c(j)=1$ for URLLC service and $\alpha_c(j)<1$ for eMBB service.

Figure 17:
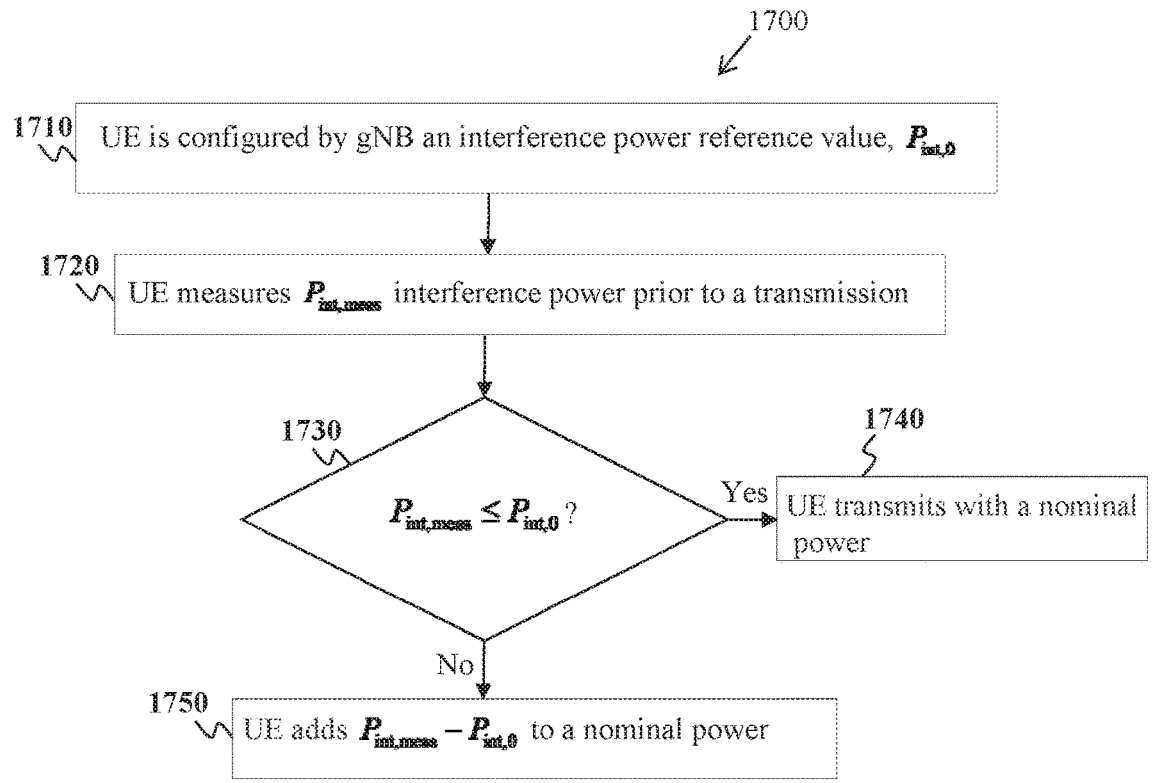
FIG. 17 illustrates an example process for a UE to determine a transmission power according to embodiments of the present disclosure.

FIG. 17 illustrates an example process 1700 for a UE to determine a transmission power according to embodiments of the present disclosure. An embodiment of the process 1700 shown in FIG. 17 is for illustration only. Other embodiments may be used without departing from the scope of the present disclosure.

A gNB configures a UE with an interference power reference value at step 1710. Prior to a transmission, the UE measures an interference power over a transmission BW at step 1720. The UE determines whether or not $P_{int,meas} \leq P_{int,0}$ at step 1730. When $P_{int,meas} \leq P_{int,0}$, the UE transmits with a transmission power that does not adjust for the measured interference power (referred to, for brevity, as "nominal" power) at step 1740. When $P_{int,meas} > P_{int,0}$, the UE increases the nominal transmission power by $P_{int,meas} - P_{int,0}$ at step 1750.

Although a determination for a transmission power described in FIG. 17 does not adjust a nominal transmission power when $P_{int,meas} \leq P_{int,0}$, such adjustment (reduction) of the nominal transmission can also be included at least when the nominal transmission power is larger than a configured value or a value determined by the UE or at least for some service or information types such as eMBB service or data (not control) information. Then, the nominal transmission power is adjusted by $P_{int,meas} - P_{int,0}$. Further when a UE is configured to transmit data for the first service type and data for the second service type during a same time and the UE is power limited (required power exceeds $P_{CMAX,c}$), the UE can prioritize power allocation to the transmission of the first service type and reduce a power for transmission of the second service type.

To reduce a probability of collisions among transmissions from UEs supporting the first service type over a same BW and a same time slot, a UE can determine a number of candidate transmission BWs and pseudo-randomly select one, for example based on the UE identity or based on a randomly generated number. The transmission BW size and the number of candidate transmission BWs can be configured to the UE by a serving gNB. The UE can consider as candidate transmission BWs only the ones resulting to a transmission power that is smaller than or equal to $P_{CMAX,c}$ for the corresponding time slot.

A gNB can also perform a LBT to determine whether a UE with the first service type transmits in a BW over a time slot of a first duration. The gNB can determine such transmission based on an increase in a received power in the BW over the time slot as, for example, due to the substantially smaller duration of the first time slot relative to the duration of the second time slot, a transmission power over the BW from the UE with the first service type is typically larger than a transmission power over the BW from a UE with the second service type. The gNB can use this determination for the transmission from the UE with the first service type to avoid processing receptions of transmissions from UEs with the second service type over the BW during the first time slot and to detect the information in the transmission from the UE with the first service type. When the gNB fails to detect the information from UEs with the second service type, due to the interference of transmissions from UEs with the first service type, the gNB can schedule respective retransmissions either for the respective data TBs or only for interfered data CBs.

An interfered UE with second service type can also perform LBT to determine whether or not a UE with first service type is transmitting in at least a partially overlapping BW. This requires transmission gaps during a time slot with the second duration, for example at the beginning of each time slot with the first duration that is included within a time slot with a second duration when it is used for transmission from the UE with the second service type, in order for the UE with the second service type to measure an interference power over a BW where the UE with the second service type transmits. When an interference power over first parts of the BW exceeds a predetermined threshold, the UE with the second service type can suspend transmission over at least the first parts of the BW in order to avoid creating interference to UEs with the first service type that are assumed to have higher priority than the second service type.

In some embodiments, a gNB assistance to a UE for determining a transmission BW is considered during a time slot for a UE transmission that is not configured by the gNB. In one example, a gNB indicates by higher layer signaling to a UE a set of one or more BW regions that the UE can use for transmissions to the gNB without associated UL grants. In another example, a gNB indicates by physical layer signaling a set of one or more BW regions that a UE can use for transmissions that are not configured by the gNB. The physical layer signaling is through a UE-common control channel that is transmitted once per number of time slots that is configured by system information or by UE-specific higher layer signaling. The gNB can configure the UE with an RNTI for scrambling CRC bits appended to the DCI bits conveyed by the UE-common control channel. The UE-common control channel can convey DCI both for UEs supporting a first service type with transmissions over a time slot having a first duration and for UEs supporting a second service type with transmissions over a time slot having a second duration where the first slot duration is smaller than the second slot duration. For example, the first service type can be URLLC and the second service type can be eMBB.

In yet another example, the mechanisms in the first example and in the second example can be combined. A gNB can configure a UE, by RRC signaling, a BW for transmissions without associated UL grants and a starting RB for the BW within a total BW. The total BW can be an UL system BW or can be dynamically indicated by a UE-common control channel. For example, a gNB can configure a UE with a BW of 4 RBs for transmissions without associated UL grants and with a second location for the 4 RBs within a total BW. The gNB can subsequently signal a total BW of 40 RBs that is available for transmissions from UEs without associated UL grants in a slot. Then, when a UE has data to transmit in a slot, the UE transmits an associated data channel (without an associated UL grant) using the second 4 RBs within the total BW of 40 RBs that is signaled by the UE-common control channel.

In one embodiment, the UE-common control channel (and other DL control signaling) is transmitted over one or more symbols that can either have a first duration or a second duration where the first symbol duration is smaller than the second symbol duration. The symbols can have the first duration when the gNB supports both service types and can have the second duration when the gNB supports only the second service type. In a second approach, the UE-common control channel is transmitted over one or more symbols that have the first duration. The first approach or the second approach enable multiplexing, over a set of common time/frequency resources, of DL control signaling for UEs supporting the first service type and for UEs supporting the second service type. Otherwise, when the DL control signaling is transmitted over symbols with the first duration for UEs supporting the first service type and over symbols with the second duration for UEs supporting the second service type, frequency division multiplexing (FDM) is used for orthogonal multiplexing.

When a gNB transmits DL control channels, including a UE-common control channel, over multiple symbols of a slot, the gNB can transmit a RS associated with the DL control channels. The association of the RS is at least in terms of providing a channel estimate for UEs receiving the DL control channels to obtain respective channel estimates for demodulation of respective DL control channels. The RS can be shared by multiple UEs, for example in a same manner as a RS for distributed EPDCCH transmission or as a CRS for PDCCH transmission. When a DL control channel, including the UE-common control channel, is transmitted only over a single symbol of a slot, two approaches for a location of a RS that UEs can use for demodulation of DL control channels are considered. In a first approach, the RS is located only in a first symbol from multiple symbols in the slot that a gNB uses to transmit DL control channels. The first approach requires that second sub-bands of a DL system BW used to transmit DL control channels in a symbol after a first symbol of a slot are a sub-set of first sub-bands of the DL system BW used to transmit DL control channels in symbols in the first symbol of the slot. In this manner, an RS availability can be ensured for UEs receiving DL control channels in a symbol after the first symbol of the slot and the gNB does not transmit another RS in the symbol. In a second approach, for transmission of a DL control channel in a symbol of a slot after a first symbol of the slot, there is no restriction on respective sub-bands and a gNB transmits an associated RS both in the first symbol and in the symbol after the first symbol of the slot.

Figure 18:
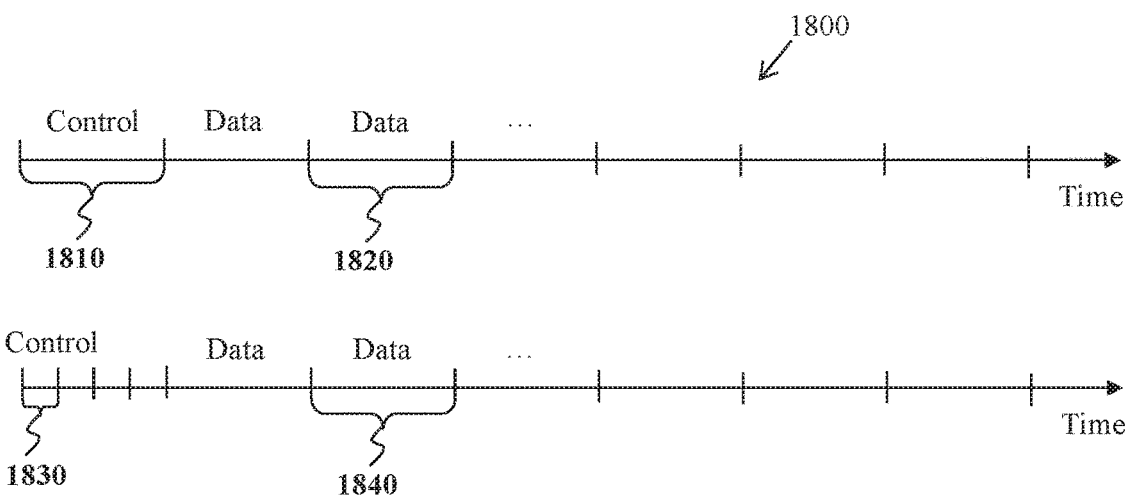
FIG. 18 illustrates an example dependence of symbol duration for control signaling on supported service types according to embodiments of the present disclosure.

FIG. 18 illustrates an example dependence of symbol duration 1800 for control signaling on supported service types according to embodiments of the present disclosure. An embodiment of the dependence of symbol duration 1800 shown in FIG. 18 is for illustration only. Other embodiments may be used without departing from the scope of the present disclosure.

A gNB can configure a UE supporting a second service type, such as eMBB service, for operation with a time slot structure that includes symbols with substantially same duration for both control transmissions 1810 and for data transmissions 1820 when the gNB does not communicate with UEs supporting a first service type, such as URLLC service. When the gNB communicates with UEs supporting the first service type and with UEs supporting the second service type, the gNB configures a UE supporting the second service type for operation with a time slot structure that includes symbols with substantially different duration for control transmissions 1830 than for data transmissions 1840 where the symbol duration for control transmissions is smaller than the symbol duration for data transmission. Not all symbols with the smaller duration need to be used for control transmissions; for example, subsequent symbols with the smaller duration can be used for transmission of data associated with the first service type. The symbol duration for control transmissions is substantially same as the symbol duration used for transmissions of data for the first service type. The same can apply for a symbol duration conveying a DMRS so that DMRS multiplexing between non-configured and configured transmissions can be orthogonal and a non-configured transmission will not cause an inability for a gNB to obtain a channel estimate for a configured transmission. For example, for both UEs supporting a first service type and UEs supporting a second service type, a DMRS symbol can have a duration determined as for the first service type and can be placed in a first or in a second symbol as it is subsequently further described.

When a UE supporting the first service type detects the UE-common control channel, the UE prioritizes a selection of a transmission BW within the indicated total transmission BW for transmission during a time slot. When the UE does not detect the UE-common control channel, the UE can select a BW for transmission during a time slot based on other criteria such as, for example, based on an LBT over a total operating system BW to determine a transmission BW with sufficiently low interference power spectral density as described in the first embodiment, or based on a BW indicated in a last UE-common control channel that the UE detected. The UE can also perform an LBT within an indicated total BW when the UE detects the UE-common control channel.

A gNB can implement several approaches for indicating a total BW to a UE for non-configured transmissions within the total BW during a time slot. In a first approach, the gNB can configure a partition of an operating system BW into a number of regions and indicate one or more of the regions. For example, the gNB can partition an operating system BW of 100 RBs in four non-overlapping regions of successive or interleaved 25 RBs, and the gNB can use a bit-map of 4 bits to indicate one or more of the four regions, for example by using a binary value of "1" to indicate that a region is included in the total BW. For example, this approach can be combined with dynamic frequency-domain ICIC. In a second approach, the gNB can configure a region and indicate RBs within the region. For example, this approach can be combined with semi-static frequency domain ICIC. For example, for an operating BW of 100 RBs, the gNB can configure to the UE a region that includes the first 24 RBs. The gNB can indicate through a UE-common control channel, transmitted in the beginning of a time slot having a second duration, RBs within the region of first 24 RBs that form the total BW. For example, indication can be by indicating one or more of two groups where each group includes 12 RBs, the two groups do not include common RBs, and the 12 RBs can be 12 consecutive RBs starting from the first RB from the 24 RBs or can be interleaved and include every second RB starting from the first or the second RB for the first or second group, respectively.

Figure 19:
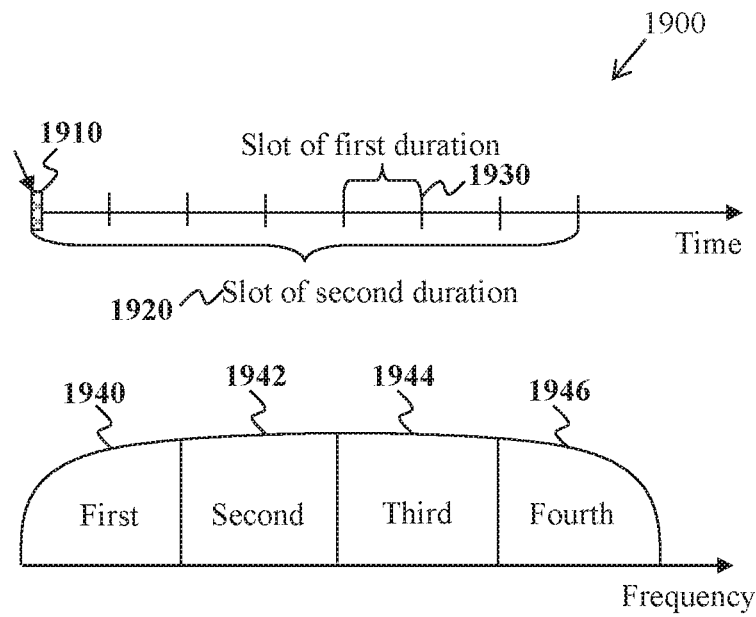
FIG. 19 illustrates an example process for a gNB to communicate at the beginning of a second time slot a total BW available for potential transmissions from UEs during a first time slot according to embodiments of the present disclosure.

FIG. 19 illustrates an example process 1900 for a gNB to communicate at the beginning of a second time slot a total BW available for potential transmissions from UEs during a first time slot according to embodiments of the present disclosure. An embodiment of the process 1900 shown in FIG. 19 is for illustration only. Other embodiments may be used without departing from the scope of the present disclosure.

A gNB transmits a UE-common control channel in a first symbol 1910 of a time slot having a second duration 1920 and on fixed or pseudo-randomly determined resources within a predetermined BW. For example, the time slot with the second duration can be for transmissions associated with eMBB service. The UE-common control channel includes information indicating a set of RBs of an operating BW for transmissions over a time slot having a first duration 1930 that is smaller than the second duration. For example, the time slot with the first duration can be for transmissions associated with URLLC service. For example, the indication can be for a set of RBs in one or more of a first 1940, second 1942, third 1944, and fourth 1946, regions of an operating BW. Upon receiving the indication for the set of RBs, either through the UE-common control channel or through higher layer signaling, a UE having a transmission over a time slot with the first duration, selects RBs from the indicated set of RBs.

In some embodiments, a configuration by a gNB of a CP length for a UE is considered to use for transmission of symbols depending on a service type or depending on whether or not the UE and the gNB synchronized UE transmissions.

A first service type can occasionally require extremely low latency that cannot be fulfilled when an associated UE performs a random access procedure with a gNB prior to transmission of data associated with the first service type. As prior to transmission the UE can synchronize with the gNB based on signals transmitted from the gNB, such as synchronization signals or RS, the UE and the gNB have a different timing that corresponds at least to the trip delay for signals from the gNB to the UE. Further, signals transmitted from the UE to the gNB also incur a trip delay and the arrival timing, relative to the local timing at the gNB, is practically different by an amount corresponding to the round trip delay. For relatively large cell sizes, such as in the order of 1 Km or larger, the unsynchronized transmissions from the UE can create inter-symbol interference and also interfere with other transmissions. Such a problem does not exist for transmissions from the gNB that originate from a same transmitter and can therefore be synchronized.

When a cell size is large enough for a round trip delay for transmissions from a UE can approach or exceed a CP length used for transmission from the gNB to UEs (referred to as nominal CP length). When the UE does not perform a random access procedure prior to transmission to the gNB so that the UE can have a valid timing advance (TA) command from the gNB, the gNB can configure the UE with a different (larger) CP length for transmissions from the UE to the gNB than for transmissions from the gNB to the UE. The CP length configuration can be UE-specific or service type specific. For example, a gNB can configure UEs with URLLC service that do not perform a random access procedure and do not have a valid TA command, to transmit symbols with a larger CP length than for symbols transmitted from the gNB to UEs or for symbols transmitted from UEs with eMBB service that perform a random access procedure prior to data transmissions.

It is possible that a UE with URLLC service also has another type of latency non-sensitive service, such as an eMBB service, and the UE performed a random access process before first transmitting data for the non-latency sensitive service and data for the URLLC service arriving later for transmission. In such case, even though the UE did not perform a random access process before transmitting data for the URLLC service, the UE has a valid TA command and can use a shorter CP for transmitting symbols conveying URLLC data information. Therefore, a UE needs to apply a longer CP, when configured by a gNB, only when the UE does not have a valid TA command such as when the UE exits a discontinuous reception (DRX) state and transmits after synchronizing with the gNB but prior to performing a random access procedure. The gNB and the UE can have a same understanding of whether or not the UE has a valid TA command, for example when different frequency resource are configured for transmissions with a nominal CP and for transmissions with a configured CP, or the gNB can attempt to detect a transmission from the UE according to both hypotheses for a CP length, or a UE can use a configured CP length for a first service type, such as URLLC service, and use a nominal CP, such as a same CP as for receptions from the gNB, for a second service type such as an eMBB service.

A configuration for a different CP length for symbols transmitted from a gNB and doe symbols transmitted by a UE can also apply for cases where gNB transmission points are different than gNB reception points and a propagation delay can be respectively different.

Figure 20:
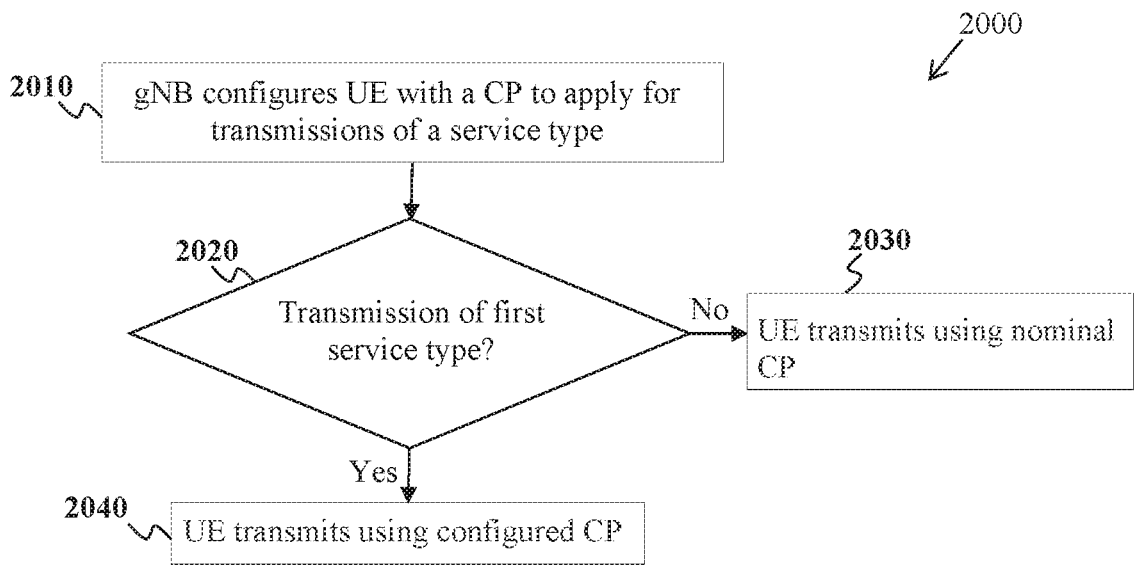
FIG. 20 illustrates an example process for a UE to determine a CP to use for transmissions according to embodiments of the present disclosure.

FIG. 20 illustrates an example process 2000 for a UE to determine a CP to use for transmissions according to embodiments of the present disclosure. An embodiment of the process 2000 shown in FIG. 20 is for illustration only. Other embodiments may be used without departing from the scope of the present disclosure.

A gNB configures a UE with a CP to apply for transmissions with a valid TA at step 2010. When the UE needs to transmit data, the UE determines an associated service type in order to determine a transmission format such as time slot duration and CP length for transmission symbols at step 2020. When the service is not of a first type requiring low latency, the UE transmits associated information by applying a nominal CP to transmission symbols at step 2030. When the service is of a first type requiring low latency, the UE transmits associated information by applying a configured CP to transmission symbols at step 2040.

In some embodiments, mechanisms for a UE to facilitate a gNB are considered to detect a transmission from the UE that is not configured by the gNB. A transmission by a UE that is not configured by a gNB can include control information about associated data transmission parameters. A first RB for the transmission of the control information can be restricted in order to facilitate detection at a gNB. For example, the first RB can be every fifth RB or every tenth RB of an operating BW or of one or more configured BW regions. In case a UE can select from multiple starting RBs for a non-configured transmission, the selection can be pseudo-random for example based on a UE identity. For the transmission of control information, the UE can either use a predetermined number of RBs or use a variable number of RBs, from a predetermined set of numbers of RBs. When the UE uses a predetermined number of RBs, the UE can adjust a transmission power in order to achieve a target reception reliability for the control information. When the UE uses a variable number of RBs, the UE can adjust both a transmission power and a number of RBs to achieve target reception reliability for the control information. The gNB can then perform multiple decoding operations according to each possible number of RBs in the predetermined set of numbers of RBs, in order to detect the control information. This is subsequently described in detail.

A first time slot symbol for the transmission of the control information can be either the first symbol or the second symbol, after including DMRS in the first symbol, of the time slot. The control information can include a field indicating an MCS used for the data transmission, a field indicating a RB allocation for the data transmission, and an identity for the UE in order for the gNB to identify the UE associated with a transmission that was not configured by the gNB. The UE can encode the control information, for example using a tail biting convolutional code (TBCC) or a polar code. Unlike DCI format transmissions by the gNB, an associated CRC for the control information transmitted by the UE is not scrambled by a RNTI, such as a RNTI derived by the UE identity, as otherwise it would not be practically possible for the gNB to confirm correct detection for the control information.

Figure 21:
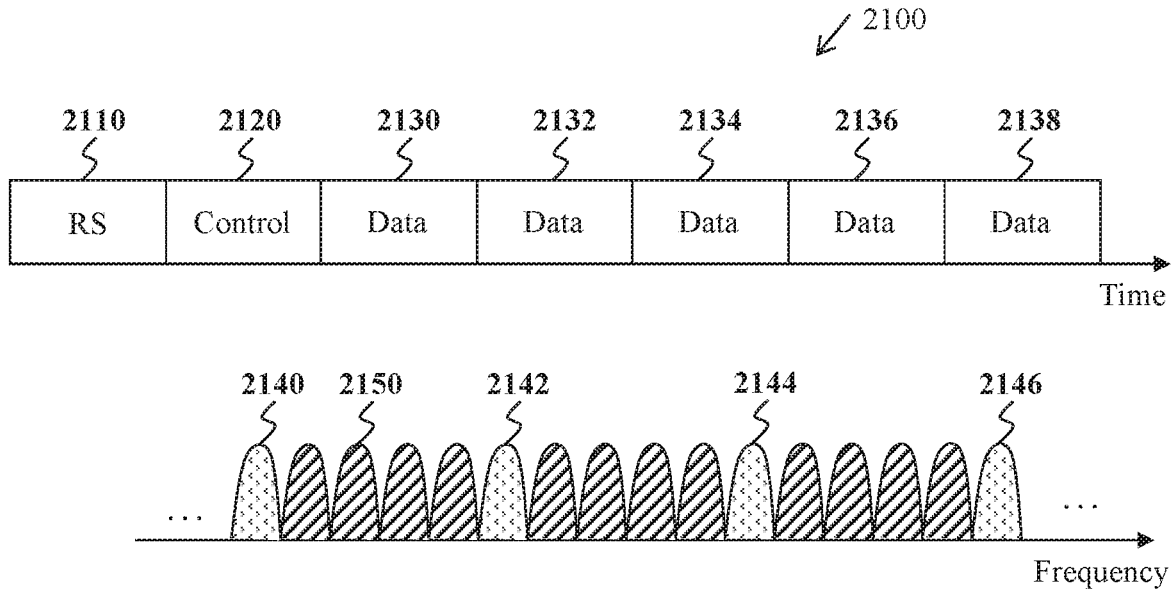
FIG. 21 illustrates an example arrangement of RS, control symbols, and data symbols in a time slot used by a UE to transmit a non-configured transmission according to embodiments of the present disclosure.

FIG. 21 illustrates an example arrangement 2100 of RS, control symbols, and data symbols in a time slot used by a UE to transmit a non-configured transmission according to embodiments of the present disclosure. An embodiment of the example arrangement 2100 shown in FIG. 21 is for illustration only. Other embodiments may be used without departing from the scope of the present disclosure.

As shown in FIG. 21, in a time slot 2110 that includes, for example, seven symbols, a UE transmits a DMRS for demodulation of control information and of data information in a first symbol of the time slot 2110 in order to enable a serving gNB to obtain a channel estimate and demodulate without additional delay the control information that the UE transmits in a second symbol 2120 and the data information that the UE transmits in the remaining symbols of the time slot 2130, 2132, 2134, 2136, and 2138. The DMRS can also serve to enable the gNB to detect/identify a subsequent non-configured transmission. The DMRS can be based on a CAZAC sequence, such as a Zadoff-Chu sequence, or can be based on a random access preamble that can also enable synchronization and serve as DMRS. The frequency resources for the transmission can include a number of RBs, from a predetermined number of RBs, such as 5, 10, 20 and so on RBs, and the starting RB can be, for example every fifth RB 2140, 2142, 2144, 2146, in an operating BW or in one or more configured BW regions while any remaining RB, such as RB 2150, can be used for the DMRS/control/data transmissions but cannot be a starting RB for the mapping of the transmissions onto the frequency resources. It is also possible that transmission can only start at a predetermined RB such as the first RB and this can further simplify a blind detection for a non-configured transmission by the gNB.

When a target reception reliability can be provided when both DMRS and control information and DMRS are multiplexed in the first symbol of the time slot, the UE can transmit DMRS on some of the SCs, for example on every other SC, and transmit control information in the remaining SCs in the first symbol of the time slot. For example, such multiplexing can apply when the payload of the control information is small or when the UE experiences a sufficiently high SINR. For example, the multiplexing structure of control information and DMRS can be configured by a gNB. When control information is transmitted only in the first symbol of the time slot, data information can be transmitted in all remaining symbols. A corresponding illustration is omitted for brevity.

When a retransmission of a data TB from a UE is scheduled by a gNB, the UE does not need to transmit control information. When incremental redundancy is used for a retransmission, SCs used for transmission of control information can be used for transmission of data information. When chase combining is used for a retransmission, SCs used for transmission of control information can be used either for DMRS transmission, or for shifting the data transmission by one symbol and terminating the transmission one symbol earlier, or can be used to provide additional, separately encoded information, such as a buffer status report, a power headroom report, or an (RSRP report, or can be left empty.

A non-configured PUSCH transmission from a UE to a serving gNB typically conveys a small data TB and, in case of a high reception reliability requirement for the data TB, the data TB is encoded with a low code rate. For such operating scenarios, there is little benefit from using incremental redundancy (IR) for retransmissions, chase combining (CC) can apply, and the control information associated with a transmission of a data TB does not need to include a redundancy version (RV) field. Further, retransmissions of a data TB can be configured by the gNB, non-configured transmission from a UE can be limited only to initial transmission for a data TB, and then the control information also does not need to include a new data indicator (NDI) field. Additionally, non-configured PUSCH transmissions are typically intended to convey a single data TB, retransmissions can be scheduled as fast as in an immediately next time slot, and therefore do not require multiple HARQ processes and the control information does not need to include a HARQ process field. The DMRS associated with the PUSCH transmission can have a predetermined configuration, such as a predetermined cyclic shift configured in advance by UE-specific higher layer signaling or, in order to increase a probability for orthogonal DMRS multiplexing in case of collisions among non-configured transmissions from multiple UEs in overlapping frequency resource during a time slot, the UE can pseudo-randomly select a cyclic shift for the DMRS, for example according to the UE identity. For example, for a total of $N_{CS}$ cyclic shifts, a UE can select a cyclic shift index as UE_ID mod $N_{CS}$ where UE_ID is the UE identity that is configured in advance to the UE by the gNB through higher layer signaling. In case of two UE transmitter antennas, the CS for the DMRS transmission from the second antenna can be determined as (UE_ID mod $N_{CS}+\lfloor N_{CS}/2 \rfloor$)mod $N_{CS}$. In case of four UE transmitter antennas, the CS for the DMRS from the second, third, and fourth antennas can be determined as (UE_ID mod $N_{CS}+\lfloor N_{CS}/2 \rfloor$)mod $N_{CS}$, (UE_ID mod $N_{CS}+\lfloor N_{CS}/4 \rfloor$)mod $N_{CS}$, and (UE_ID mod $N+\lfloor 3 \cdot N_{CS}/4 \rfloor$)mod $N_{CS}$ where $\lfloor \ \rfloor$ is the floor function that decreases a number to the previous integer.

Based on the above, a control information transmitted from a UE and providing information for a non-configured transmission from the UE can include one or more of a UE identity, an MCS, and a RB allocation. The control information can be transmitted using QPSK modulation. The data information can also be transmitted using QPSK modulation and this substantially limits the number of possible MCS considering a typically small target code rate; nevertheless, it is not required that data transmission uses only QPSK modulation and higher modulation orders, such as QAM16, can also apply. For example, when a UE determines a RSRP larger than a first threshold (or a path-loss smaller than a second threshold), the UE uses QAM16 modulation; otherwise the UE uses QPSK modulation. For example, when the UE generates data information bits above a threshold, the UE uses QAM16 modulation; otherwise, the UE uses QPSK modulation. For example, the modulation scheme can be configured in advance to the UE by the gNB. Moreover, the RB allocation can be determined based only on a first RB and a number of allocated RBs. The RB distribution can be predetermined, starting from the RB index of the first RB for the control information transmission and continuing for a number of consecutive RB indexes or for a number of interleaved RB indexes such as every second RB index. The control information can additionally include a buffer-status report that the gNB can use to schedule subsequent transmissions in order to improve reception robustness for data information relative to non-configured transmissions.

Target code rates, or equivalently target spectral efficiency values, for control information and for data information (with CRC) in order to achieve respective reception reliability targets can depend on a network deployment and on a serving gNB implementation and can be configured to a UE by the gNB for a service type. When the UE needs to perform a non-configured transmission to the gNB, the UE can determine a number of control information bits (if not predetermined) and a number of data information bits and CRC bits. Based on a RSRP measurement and on the reference transmission power of the signal used for the RSRP measurement, the UE can determine a path-loss. Using the configured spectral efficiency values and the path-loss, the UE can determine a transmission power, for example as in Equation 1 or Equation 2. Unless a number of RBs used by the UE for the non-configured transmission is predetermined or preconfigured by the gNB, the UE can adjust the number of RBs in order to achieve the target spectral efficiency or, equivalently, a target code rate. For example, assuming that the control information transmitted from a UE to a serving gNB includes a UE identity field of 16 bits, a data MCS field of 2 bits, and a data RB allocation field of 2 bits, the total control information is 20 bits and, for a RB that includes 12 sub-carriers, a target code rate of 1/12 can be achieved by transmitting the control information over 20*12/(2*12)=10 RBs in one symbol of a time slot while a target code rate of 1/6 can be achieved by transmitting the control information over 20*12/(2*6)=5 RBs in one symbol of a time slot.

The control information and the data information do not need to be transmitted over a same number of RBs as a different number of RBs can be required to achieve a respective target code rate. The same applies for respective transmission powers. Nevertheless, to simplify overall operation, simplify UE transmitter and gNB receiver implementations, and use a same DMRS to demodulate both control information and data information, the RBs and the power can be same for the transmission of control information and data information. Then, a RB allocation field does not need to be included in the control information transmitted from the UE. For example, a UE can determine the RBs to be the larger of the number of RBs required for the control information or for the data information to achieve a respective target code rate.

Figure 22:
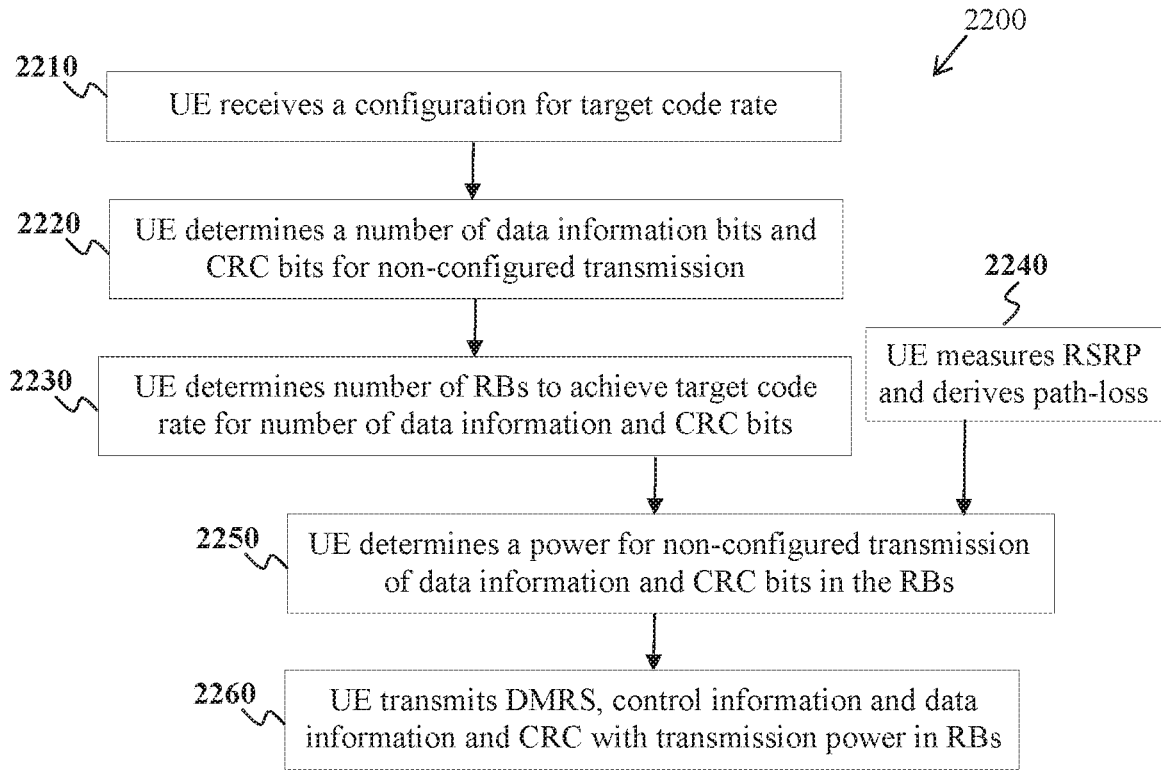
FIG. 22 illustrates an example process for a UE to determine a number of RBs and a transmission power for a non-configured transmission according to embodiments of the present disclosure.

FIG. 22 illustrates an example process 2200 for a UE to determine a number of RBs and a transmission power for a non-configured transmission according to embodiments of the present disclosure. An embodiment of the process 2200 shown in FIG. 22 is for illustration only. Other embodiments may be used without departing from the scope of the present disclosure.

A UE receives configuration information from a gNB for at least for a target code rate for transmitting data information and CRC bits at step 2210. The UE determines a number of data information bits and CRC bits for non-configured transmission in a time slot at step 2220. Subsequently, based on the target code rate and the number data information and CRC bits, the UE determine a number of RBs for the non-configured transmission at step 2230. For example, denoting by $r_{max}$ the target code rate, by $O_{data}+O_{CRC}$ the number of data information bit and CRC bits, for $N_{sc}^{RB}$ the number of sub-carrier per RB, and for QPSK modulation, the number of RBs $N_{RB}$ can be determined as $N_{RB}=\lceil(O_{data}+O_{CRC})/(2 \cdot N_{sc}^{RB} \cdot r_{max})\rceil$. The UE also measures a RSRP and derives a path-loss at step 2240. The RSRP measurement can occur before, or after, or at a same time as the determination for the non-configured transmission. Based on the determination for a number of RBs and for a path-loss, the UE determines a transmission power at step 2250, for example as in Equation 1 or Equation 2. Finally, the UE, at step 2260, transmits DMRS, control information and data information and CRC using the determined transmission power in the RBs during the time slot.

When a gNB detects the control information but fails to detect the data TB, the gNB can schedule a retransmission of the data TB by transmitting a DCI format in a PDCCH. The PDCCH conveying the DCI format scheduling the data TB retransmission can be transmitted after a predetermined number of time slots of first duration that the gNB can inform to UEs by UE-common higher layer signaling, such as broadcast system information, or by UE-specific higher layer signaling, or the number of time slots can be specified in the system operation. The gNB scrambles a CRC of the DCI format with the identity of the UE that the eNB determines from the control information transmitted from the UE. The DCI format can additionally include one or more of an MCS, a RB allocation, and a DMRS CS field. The DCI format can additionally include a TPC command for the retransmission. The DCI format can additionally include a TA command for the retransmission. Then, a non-configured transmission for an initial transmission of a data TB can use a first CP length and a configured retransmission for the data TB can use a second CP length where the second CP length is smaller than the first CP length. In case the DCI format transmitted from the gNB addresses multiple UEs, it can act as a DCI scheduling an RAR where a CRC is scrambled by a UE-common RNTI and the RAR fields include the identity for one or more UEs and at least one of an MCS, RB allocation, DMRS CS, TPC, or TA field.

Similar to the PDCCH transmission, the UE transmits a PUSCH conveying a retransmission of the data TB after a predetermined number of time slots of first duration that the gNB can inform to UEs by UE-common higher layer signaling, such as broadcast system information, or by UE-specific higher layer signaling, or the number of time slots can be specified in the system operation.

A HARQ-ACK transmission from a UE in response to a scheduled data transmission of a first service type, such as URLLC service, from a gNB to the UE can also be scheduled in order to avoid or reduce interference to the HARQ-ACK transmission from UEs with ongoing transmissions associated to a second type service, such as eMBB service. Therefore, a DCI format scheduling data transmission of a first service type to a UE can include a field indicating frequency resources for corresponding HARQ-ACK transmission from the UE. For example, the frequency resources can include a starting RB in a system BW. When the total number of RBs for HARQ-ACK transmission is not configured in advance by the gNB or specified in the system operation, the DCI format can also include the number of RBs. When a timing of HARQ-ACK transmission from a UE relative to a time slot of a corresponding data transmission to the UE is not is not configured in advance by the gNB or specified in the system operation, the DCI format can also include the HARQ-ACK transmission timing.

When a UE does not detect in a time slot a DCI format scheduling a retransmission of a data TB, the UE repeats the initial transmission of the data TB in the first available time slot.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) operating with a new radio (NR) radio access technology (RAT), the UE comprising:
   a transceiver configured to:
      receive synchronization signals and a master information block (MIB) in a first bandwidth (BW);
      receive a physical downlink control channel (PDCCH) in a second BW wherein the second BW is indicated by an offset in the MIB relative to the first BW and the PDCCH conveys a downlink control information (DCI) format; and
      receive information for a partitioning of a predetermined number of subframes in normal subframes and in multicast-broadcast single-frequency network (MBSFN) subframes according to a long term evolution (LTE) RAT.

2. The UE of claim 1, wherein the DCI format configures a reception of a first system information block (SIB) that indicates a number of antenna ports used for transmission of a common reference signal (CRS) according to the LTE RAT.

3. The UE of claim 2, wherein the transceiver is further configured to rate match a reception of a physical downlink shared channel (PDSCH) around subcarriers used for CRS transmission when the PDSCH and the CRS use a same subcarrier spacing.

4. The UE of claim 2, wherein the SIB indicates:
   configuration information for transmission of channel state information reference signals (CSI-RS) according to the LTE RAT; and
   a configuration for a first number of subframe symbols in each normal subframe and for a second number of subframe symbols in each MBSFN subframe, and
   wherein the transceiver is further configured to exclude from NR RAT receptions symbols and subcarriers of the transmission of the CSI-RS, the first number of subframe symbols, and the second number of subframe symbols.

5. The UE of claim 4, wherein the transceiver is further configured to receive an indication to perform a third number of decoding operations for PDCCH receptions according to the NR RAT when the UE does not also perform decoding operations for PDCCH receptions according to the LTE RAT.

6. The UE of claim 1, wherein the transceiver is further configured to receive an indication to perform a first number of decoding operations for PDCCH receptions conveying a first DCI format according to the NR RAT and a second number of decoding operations for PDCCH receptions conveying a second DCI format according to the LTE RAT.

7. The UE of claim 1, wherein the transceiver is further configured to receive an indication in the MIB for an absence or presence of the LTE RAT.

8. The UE of claim 1, wherein the transceiver is further configured to:
   receive a subframe number and a downlink BW for the LTE RAT;
   determine symbols and subcarriers used for transmissions of synchronization signals and of MIB according to the LTE RAT; and
   perform a rate matching operation for NR RAT receptions around the symbols and subcarriers.

9. A method by a first base station operating with a new-radio (NR) radio access technology (RAT), the method comprising:
   transmitting, to a second base station that uses a long term evolution (LTE) RAT, a first signal over a first link, wherein the first signal indicates a bandwidth for transmission of synchronization signals and a first system information block according to the NR RAT; and
   receiving a second signal comprising information for partitioning a predetermined number of subframes in normal subframes and in multicast-broadcast single-frequency network (MBSFN) subframes according to the LTE RAT.

10. The method of claim 9, further comprising receiving the second signal, from the second base station over a second link, the second signal indicating a number of decoding operations for a physical downlink control channel (PDCCH) to configure a user equipment (UE).

11. The method of claim 9, further comprising receiving the second signal, from the second base station, over a second link, wherein the second signal comprises:
   configuration information for a first number of subframe symbols in each normal subframe and for a second number of subframe symbols in each MBSFN subframe, and wherein the first base station does not transmit in the first number of subframe symbols or in the second number of subframe symbols.

12. The method of claim 9, further comprising receiving the second signal, from the second base station, over a second link, the second signal indicating a cell identity and a number of antenna ports for transmitting a common reference signal (CRS) from the second base station, and wherein symbols and subcarriers of CRS transmission are determined from the number of antenna ports.

13. The method of claim 9, further comprising receiving the second signal, from the second base station, over a second link, the second signal comprising configuration information for receiving sounding reference signals (SRS)

from the second base station, and wherein symbols of SRS receptions are determined from the configuration information.

14. The method of claim 9, further comprising receiving the second signal, from the second base station, over a second link, the second signal comprising configuration information for downlink, uplink, and special subframes over a frame of ten subframes according to the LTE RAT.

15. A method of a user equipment (UE) operating with a new radio (NR) radio access technology (RAT), the method comprising:
    receiving synchronization signals and a master information block (MIB) in a first bandwidth (BW);
    receiving a physical downlink control channel (PDCCH) in a second BW wherein the second BW is indicated by an offset in the MIB relative to the first BW and the PDCCH conveys a downlink control information (DCI) format that configures a reception of a first system information block (SIB); and
    receiving information for a partitioning of a predetermined number of subframes in normal subframes and in multicast-broadcast single-frequency network (MBSFN) subframes according to a long term evolution (LTE) RAT.

16. The method of claim 15, wherein the DCI format configures a reception of a first system information block (SIB) that indicates a number of antenna ports used for transmission of a common reference signal (CRS) according to the LTE RAT.

17. The method of claim 16, further comprising rate matching a reception of a physical downlink shared channel (PDSCH) around subcarriers used for CRS transmission when the PDSCH and the CRS use a same subcarrier spacing.

18. The method of claim 15, further comprising receiving an indication to perform a first number of decoding operations for PDCCH receptions conveying a first DCI format according to the NR RAT and a second number of decoding operations for PDCCH receptions conveying a second DCI format according to the LTE RAT.

19. The method of claim 18, further comprising receiving an indication to perform a third number of decoding operations for PDCCH receptions according to the NR RAT when the UE does not perform decoding operations for PDCCH receptions according to the LTE RAT.

20. The method of claim 15, further comprising receiving an indication in the MIB for an absence or presence of the LTE RAT.

* * * * *